United States Patent
Kitajima

(10) Patent No.: US 7,986,847 B2
(45) Date of Patent: Jul. 26, 2011

(54) DIGITAL VIDEO CAMERA WITH A MOVING IMAGE ENCODING FEATURE AND CONTROL METHOD THEREFOR, THAT SELECTIVELY STORE DECODED IMAGES AS CANDIDATE REFERENCE IMAGES

(75) Inventor: Kotaro Kitajima, Yokahama (JP)

(73) Assignee: Canon Kabushiki Kaisha (JP)

( * ) Notice: Subject to any disclaimer, the term of this patent is extended or adjusted under 35 U.S.C. 154(b) by 1495 days.

(21) Appl. No.: 11/251,127

(22) Filed: Oct. 14, 2005

(65) Prior Publication Data

US 2006/0083299 A1 Apr. 20, 2006

(30) Foreign Application Priority Data

Oct. 15, 2004 (JP) .................................. 2004-302064

(51) Int. Cl.
*G06K 9/36* (2006.01)
(52) U.S. Cl. ........ 382/236; 382/100; 382/232; 382/238; 382/278; 375/240.12; 375/240.13; 375/240; 348/456; 348/526
(58) Field of Classification Search ................. None
See application file for complete search history.

(56) References Cited

U.S. PATENT DOCUMENTS

| | | | |
|---|---|---|---|
| 5,565,920 A | 10/1996 | Lee et al. | |
| 6,052,417 A * | 4/2000 | Fujiwara et al. | 375/240.12 |
| 6,580,829 B1 | 6/2003 | Hurst et al. | |
| 6,731,684 B1 | 5/2004 | Wu | |
| 2004/0125876 A1 * | 7/2004 | Kodama et al. | 375/240.16 |

FOREIGN PATENT DOCUMENTS

| | | |
|---|---|---|
| EP | 0 989 755 A2 | 3/2000 |
| EP | 1422928 A2 | 5/2004 |
| JP | 2000-115778 A | 4/2000 |
| JP | 2003-348591 A | 12/2003 |
| WO | 97/39577 A1 | 10/1997 |

OTHER PUBLICATIONS

Office Action issued on Jun. 22, 2009 in corresponding Japanese Patent Application No. 2004-302064.
Jianping Fan et al.; "Adaptive motion-compensated video coding scheme towards content-based bit rate allocation"; Journal of Electronic Imaging; Oct. 2000;vol. 9(4); pp. 521-533.
Relevant portion of European Search Report of corresponding European Application EP 05 02 2454. May 5, 2006.
Summons to attend oral Proceedings issued in corresponding European Patent Application No. 050224542 dated Feb. 2, 2011.

* cited by examiner

*Primary Examiner* — Sath V Perungavoor
*Assistant Examiner* — Jason Heidemann
(74) *Attorney, Agent, or Firm* — Rossi, Kimms & McDowell LLP

(57) ABSTRACT

Detects from camera information frames of probable low continuity, such as frames in which a strobe is flashed, and does not use such frames as candidate images for a reference image. As a result, the possibility that the candidate images in the frame memory are images of high continuity with a frame to be encoded increases, enabling efficient motion vector detection and making possible low data-generation-volume encoding.

12 Claims, 18 Drawing Sheets

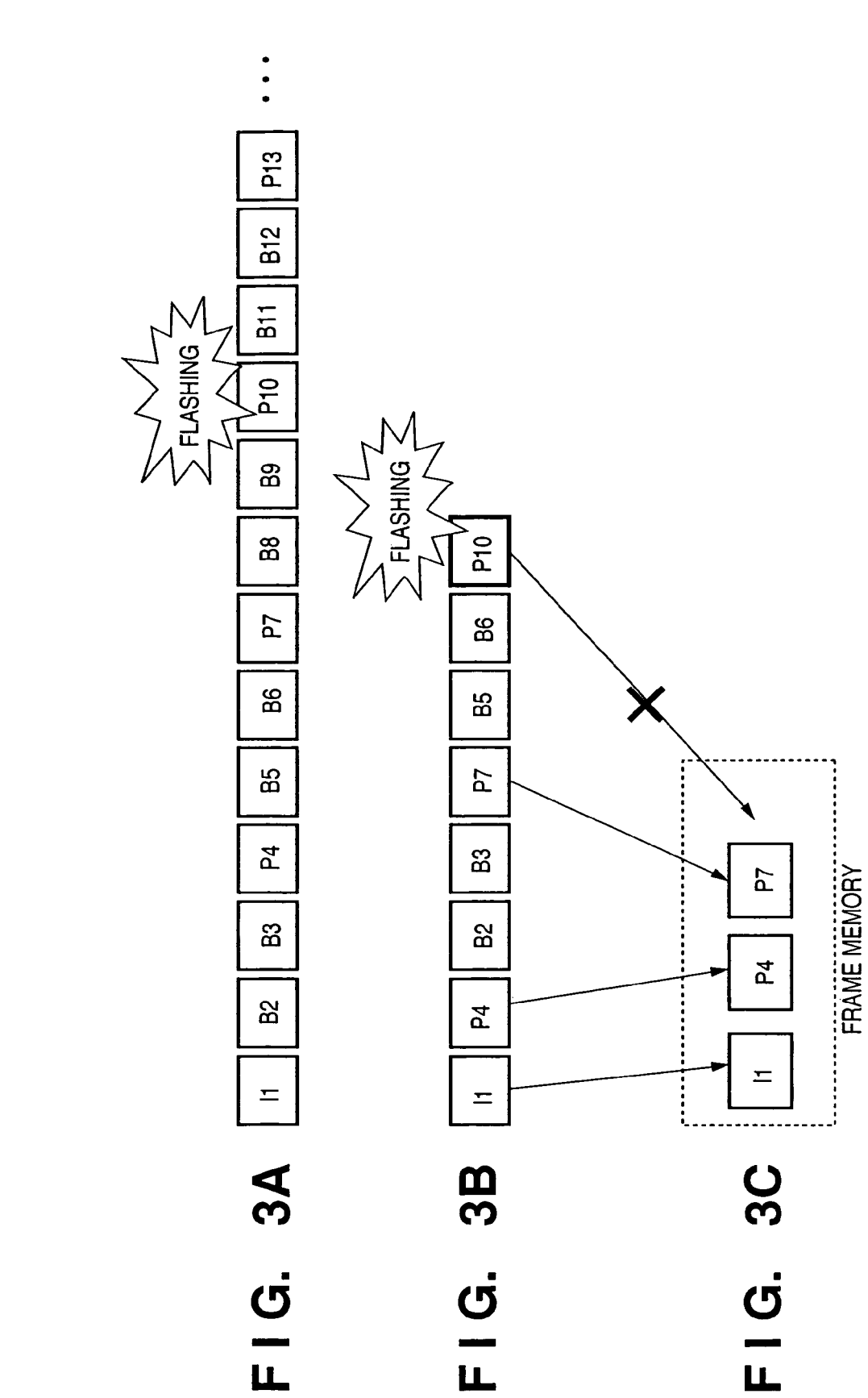

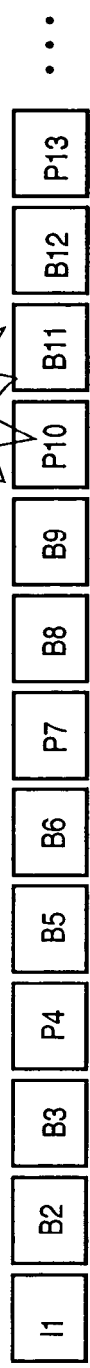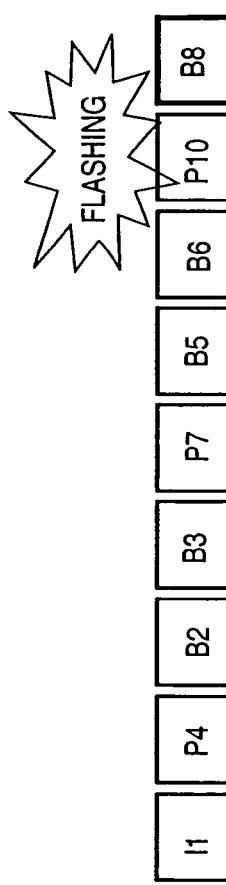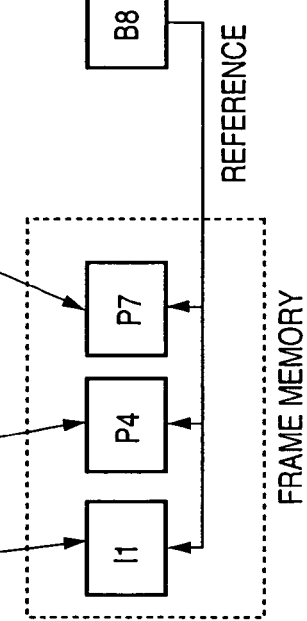
F I G. 4A
F I G. 4B
F I G. 4C

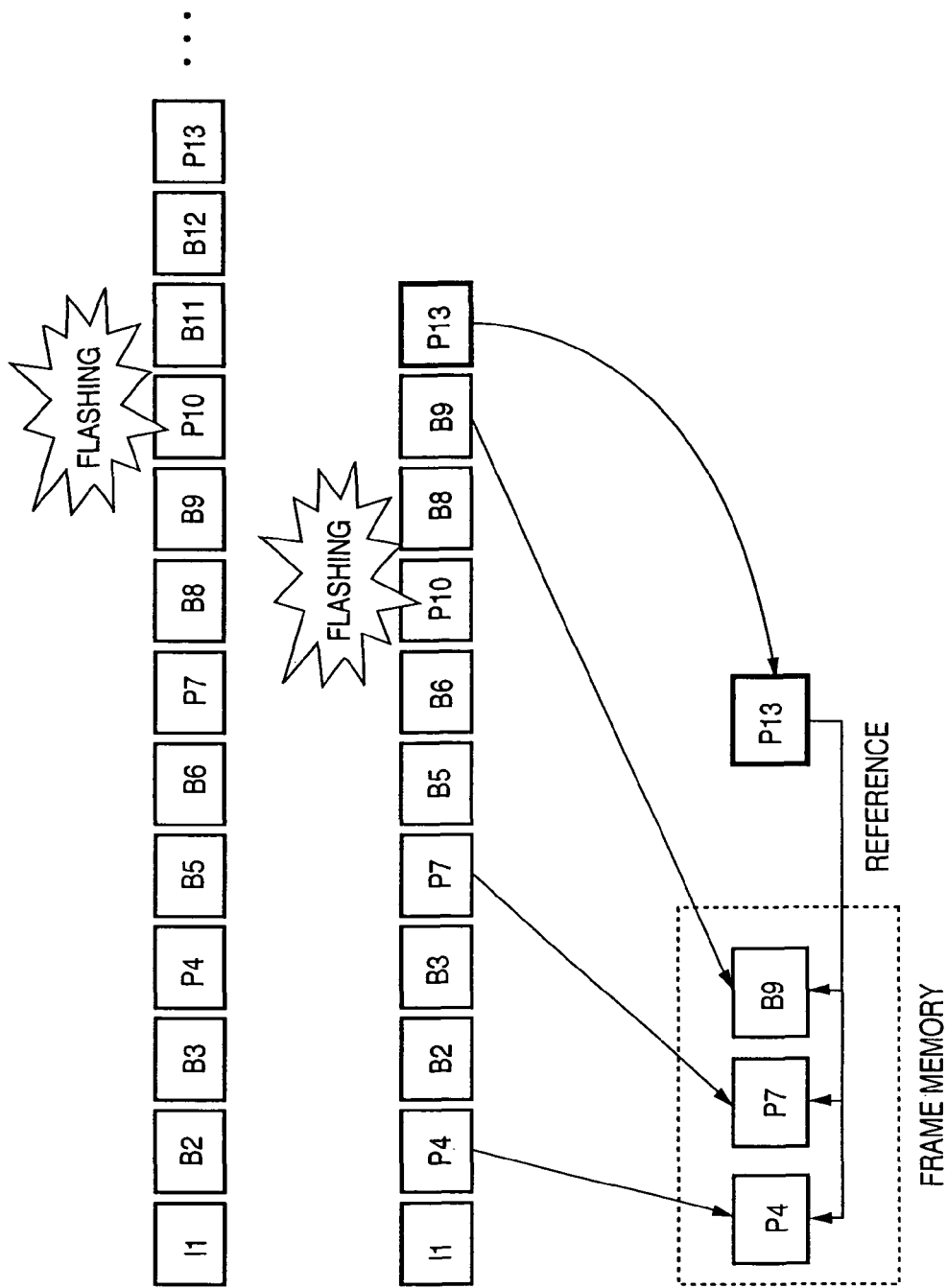

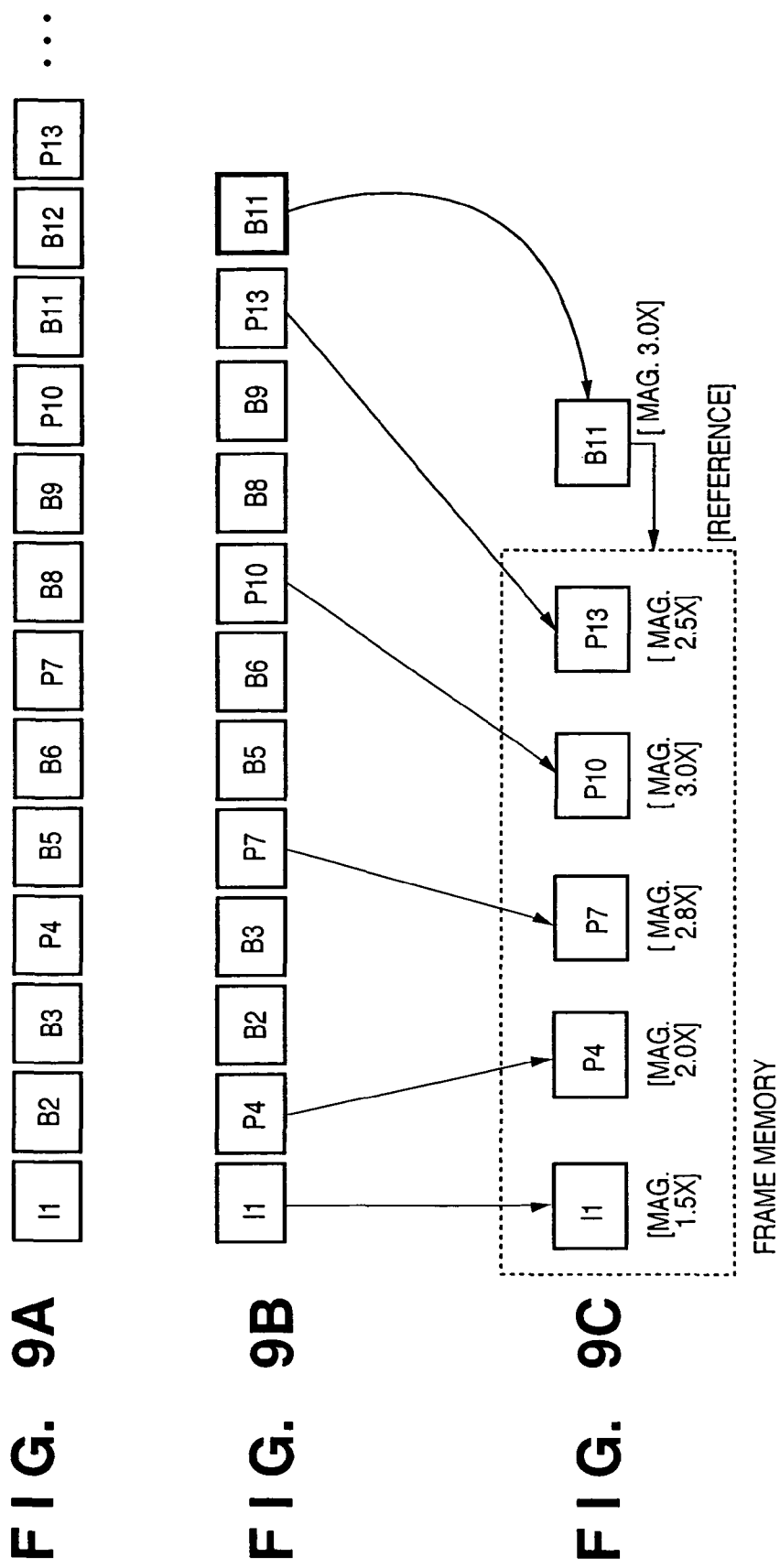

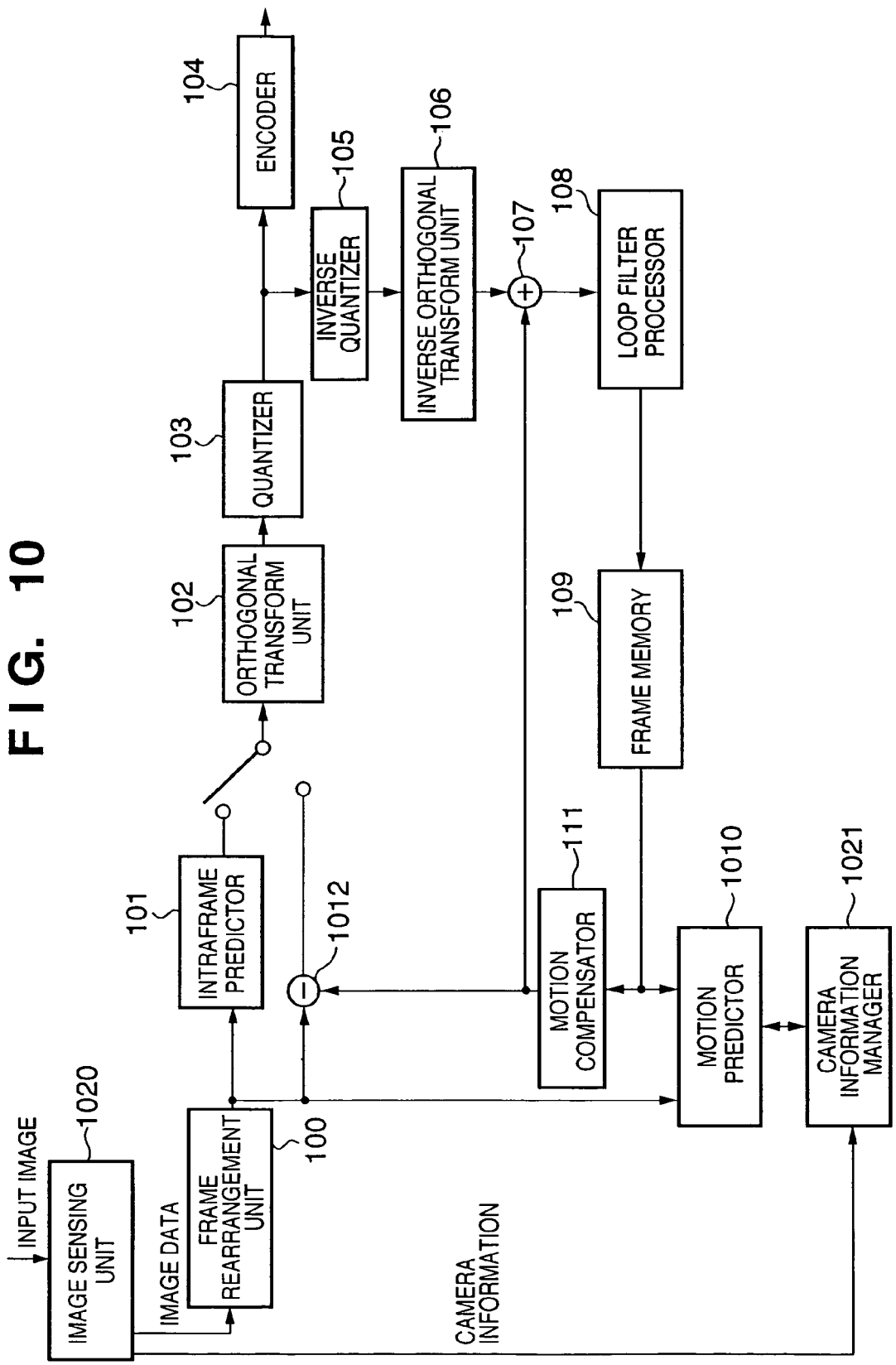

FIG. 11A
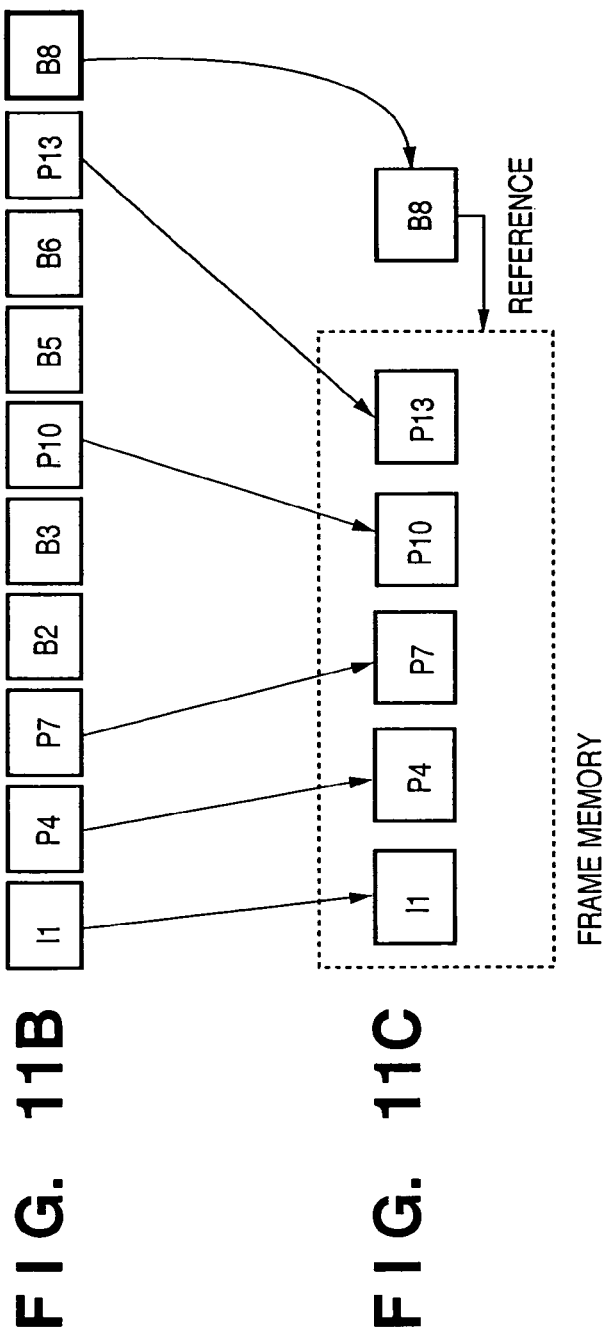
FIG. 11B
FIG. 11C

F I G. 15
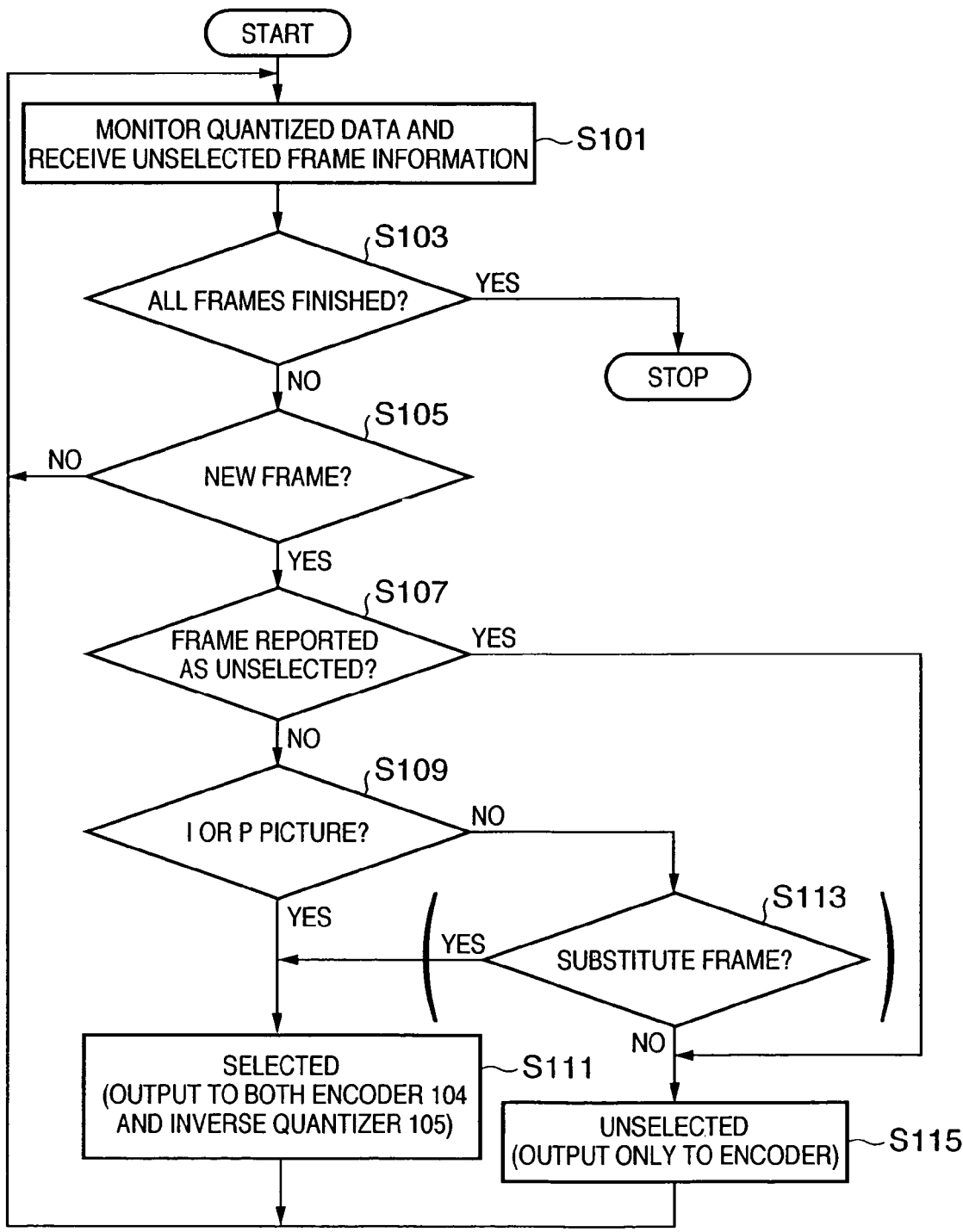

DIGITAL VIDEO CAMERA WITH A MOVING IMAGE ENCODING FEATURE AND CONTROL METHOD THEREFOR, THAT SELECTIVELY STORE DECODED IMAGES AS CANDIDATE REFERENCE IMAGES

FIELD OF THE INVENTION

The present invention relates to a moving image encoding apparatus that compression-encodes a moving image and a control method therefor, and more particularly, to a moving image encoding apparatus that predicts interframe motion and a control method therefor.

BACKGROUND OF THE INVENTION

In recent years, in order to store and transmit moving image information as digital data, a technology that encodes image information at a high compression ratio and with high picture quality is sought. As a compression technique for image information, a compression-encoding method in which an orthogonal transform such as a discrete cosine transform and motion prediction/motion compensation are combined has come to be widely diffused, as typified by the MPEG method.

In addition, in recent years, as an encoding method that aims for an even higher compression ratio and even better picture quality, there is ITU-T H.264/AVC(MPEG4 AVC). It is known that, compared to conventional encoding methods such as MPEG2 and MPEG4, H.264, despite requiring more calculations for decoding, achieves higher encoding efficiency (refer, for example, to ISO/IEC FCD 14496-10:2004 (MPEG-4 Part 10) 'Advanced Video Coding').

FIG. 13 shows an example of a basic configuration of an image encoding apparatus that compression-encodes image information using the H.264 method. The image encoding apparatus shown in FIG. 13 comprises a frame rearrangement unit 1300, an intraframe predictor 1301, an orthogonal transform unit 1302, a quantizer 1303, an encoder 1304, an inverse quantizer 1305, and an inverse orthogonal transform unit 1306, and further comprises an incrementer 1307, a loop filter processor 1308, a frame memory 1309, a motion predictor 1310, a motion compensator 1311 and a decrementer 1312.

A description is now given of steps in the encoding process of the image encoding apparatus shown in FIG. 13.

A digitized moving image signal (moving image data) is input to the frame rearrangement unit 1300. At the frame rearrangement unit 1300, the frames (sometimes referred to as pictures) are rearranged in the order in which they are to be encoded. As for the image frame type, there is an I picture encoded from information within the same frame, a P picture encoded using the difference with a chronologically earlier frame, and a B picture, which can also utilize the difference with a chronologically later (locally-decoded) frame. The B picture refers to a chronologically later frame, and therefore its place in the order of encoding comes after that of a reference frame.

The image frames rearranged into encoding order are then encoded in units of macro blocks, which are the smallest spaces having a predetermined size. At the intraframe predictor 1301, the I picture (that is, the macro block that performs intraframe prediction) predicts the picture elements in the macro block from the picture element information within the frame and outputs data on the difference between the predicted pixels and the actual pixels (the current pixels) to the orthogonal transform unit 1302.

If the input image is a B picture or a P picture (that is, a macro block that performs interframe prediction), then data on the difference between an interframe prediction predicted image, to be described later, and the current image is output to the orthogonal transform unit 1302.

At the orthogonal transform unit 1302, a 4×4 pixel integer transform (orthogonal transform) is performed, and the input differential data is converted into frequency components and given to the quantizer 1303. At the quantizer 1303, the frequency component data is quantized. The image data quantized by the quantizer 1303 is then output to the encoder 1304 and the inverse quantizer 1305.

At the encoder 1304, the quantized data is variable-length encoded or incrementally encoded and output as an encoded bit stream. By contrast, at the inverse quantizer 1305, the image data quantized by the quantizer is dequantized, decoded into frequency components, and then further decoded into a predicted error image by an inverse orthogonal transform performed by the inverse orthogonal transform unit 1306.

If the image output from the inverse orthogonal transform unit 1306 is a P picture or a B picture predicted error image, then the image is decoded into a frame by the incrementer 1307 adding a motion-compensated image from the motion compensator 1311 to the predicted error image.

The locally-decoded image is subjected to a filtering process by the loop filter 1308 that eliminates block distortion and is then stored in the frame memory 1309. In the MPEG2 encoding method, the I and P pictures are always used as reference image frames for the purpose of motion detection, and the B picture cannot be used as a reference frame. As a result, it can be determined whether or not it is necessary to store the target image frame in the frame memory 1309 according to the type of picture. By contrast, in the H.264 method, there are instances in which the P picture is not used as the reference frame, even though it is a P picture. In addition, there are also instances in which the B picture is not used as the reference frame, despite being a B picture. Moreover, it is possible to store an arbitrary number of locally-decoded frames in the frame memory 1309 for use as reference frames.

The motion predictor 1310, when it performs interframe prediction, searches the decoded images stored in the frame memory 1309 for the image with the smallest difference from the input image and calculates and outputs the motion vector that is the motion information of a frame to be encoded of the input image. In addition, the motion predictor 1310 also outputs reference direction information as to whether the reference image is ahead of or behind the input image, and whether it is the immediately preceding or the immediately succeeding image. The motion compensator 1311 performs the calculations indicated by the motion vector and the reference direction information and outputs a motion-compensated image (a predicted image). The decrementer 1312 takes the difference between the input image and the motion-compensated image and outputs a differential image (a predicted error image) to the orthogonal transform unit 1302.

It should be noted that whether data is output to the orthogonal transform unit 1302 from the intraframe predictor 1301 or from the decrementer 1312 is switched as convenient according to the encoding mode.

As described above, in the H.264 method it is possible to use any frame as the reference frame for motion detection regardless of the picture type. This type of encoding method enables selection of the reference image from among a greater number of candidate images than an encoding method that performs motion prediction referencing only a reference frame of a particular picture type, and consequently it is possible to perform high-accuracy motion prediction. However, in order to carry out efficient encoding, it is necessary to select as a reference candidate image an image frame that is as well-suited as possible for reference when performing motion prediction. If the best reference image can be selected, the data for the difference with the input image will shrink and the generated encoding volume can be reduced.

In addition, with an encoding method like the H.264 method, which stores a plurality of image in the frame memory and can use all of them as reference images, there is the problem that the volume of calculations that must be performed increases dramatically when searching for the motion vector from among all the images in the frame memory.

SUMMARY OF THE INVENTION

The present invention is conceived in light of problem s in the conventional technology like those described above, and has as its object to make it possible to select an effective reference image as the reference image to be used in moving image encoding using motion prediction.

According to an aspect of the present invention, there is provided a moving image encoding apparatus comprising: a motion information detecting unit configured to detect motion information of a picture to be encoded of an input moving image using one or some reference images; an encoding unit configured to encode a difference information in a predicted picture generated using the motion information; a storage unit configured to store candidate images of the reference images; and a selecting unit configured to select an image that should not be kept as the candidate image in the storage unit or an image that should be used as the reference image from among the candidate images in the storage unit, in accordance with a information obtained from a camera which outputs the input moving image.

According to another aspect of the present invention, there is provided a control method for a moving image encoding apparatus, the control method comprising: a motion information detecting step of detecting motion information of a picture to be encoded of an input moving image using one or some reference images; an encoding step of encoding a difference information in a predicted picture generated using the motion information; a storage step of storing candidate images of the reference images into a storage unit; and a selecting step of selecting an image that should not be kept as the candidate image in the storage unit or an image that should be used as the reference image from among the candidate images in the storage unit, in accordance with a camera information corresponding to the input moving image.

By selecting the image that should be used as the reference image based on the camera information during image sensing, the image encoding apparatus of the present invention makes it possible to detect the motion vector referencing only an image effective as a motion prediction reference image, enabling encoding efficiency to be improved.

Other objects and advantages besides those discussed above shall be apparent to those skilled in the art from the description of preferred embodiments of the invention which follows. In the description, reference is made to the accompanying drawings, which form a part thereof, and which illustrate an example of the various embodiments of the invention. Such examples, however, are not exhaustive of the various embodiments of the invention, and therefore reference is made to the claims which follow the description for determining the scope of the invention.

BRIEF DESCRIPTION OF THE DRAWINGS

FIGS. 3A, 3B and 3C are diagrams showing an image processing order and frame memory content according to the first embodiment;

FIGS. 4A, 4B and 4C are diagrams showing an image processing order and frame memory content according to the first embodiment;

FIGS. 5A, 5B and 5C are diagrams showing an image processing order and frame memory content according to the first embodiment;

FIGS. 9A, 9B and 9C are diagrams showing an image processing order and frame memory content according to the third embodiment of the present invention;

FIG. 10 is a block diagram showing an example of the configuration of a video camera as a moving image encoding apparatus according to a fourth embodiment of the present invention;

FIGS. 11A, 11B and 11C are diagrams showing an image processing order and frame memory content according to the third embodiment of the present invention;

FIG. 15 is a flow chart illustrating the operation of a frame selector in the first embodiment of the present invention;

The accompanying drawings, which are incorporated in and constitute a part of the specification, illustrate embodiments of the invention and, together with the description, serve to explain the principles of the invention.

DETAILED DESCRIPTION OF THE INVENTION

Preferred embodiments of the present invention will now be described in detail in accordance with the accompanying drawings.

First Embodiment

Figure 1:
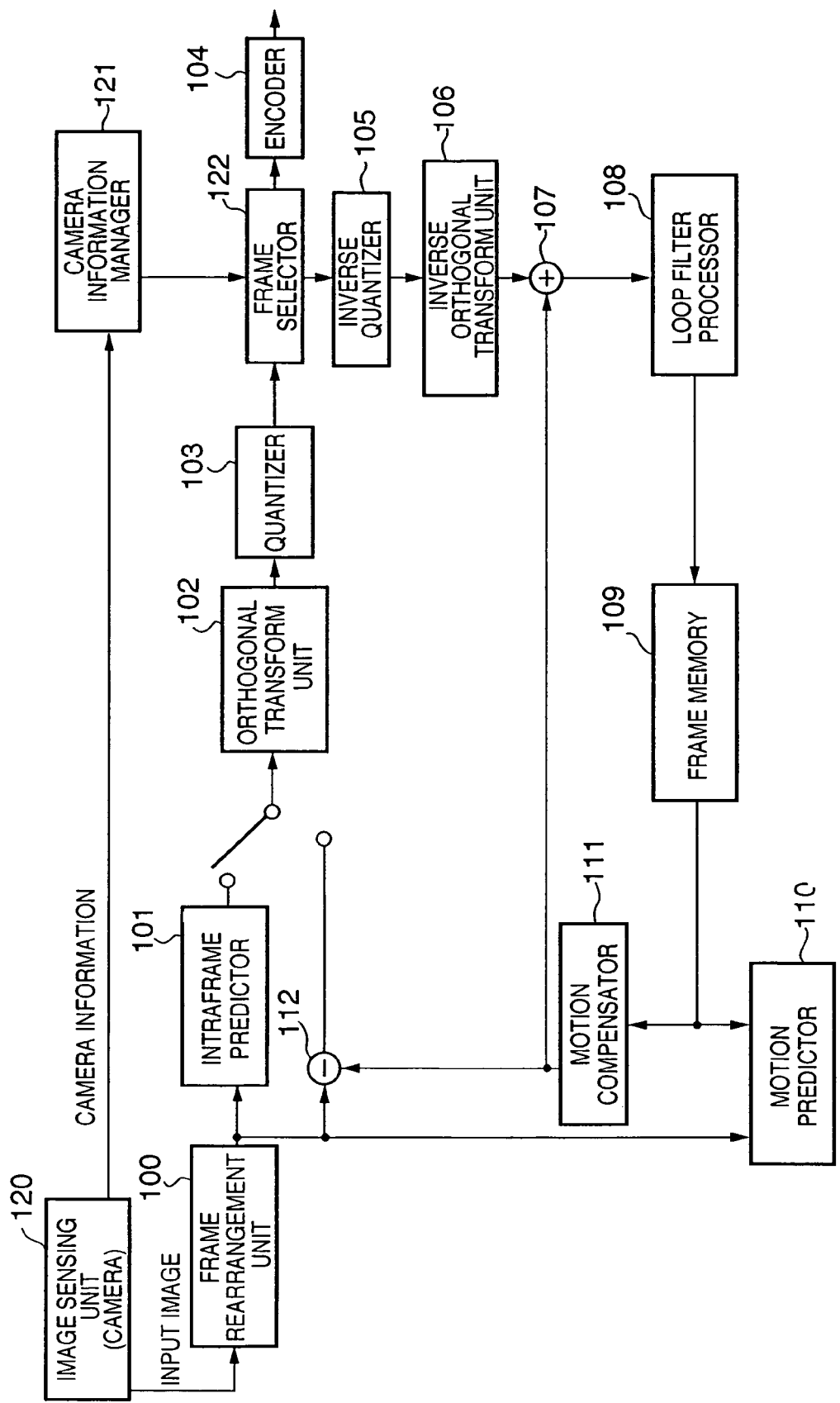
FIG. 1 is a block diagram showing an example of the configuration of a video camera as a moving image encoding apparatus according to a first embodiment of the present invention.

FIG. 1 is a block diagram showing an example of the configuration of a digital video camera as a moving image encoding apparatus according to a first embodiment of the present invention. The digital video camera of the present embodiment is characterized by selecting a locally-decoded image recorded in the frame memory as the reference image using the camera information.

Figure 13:
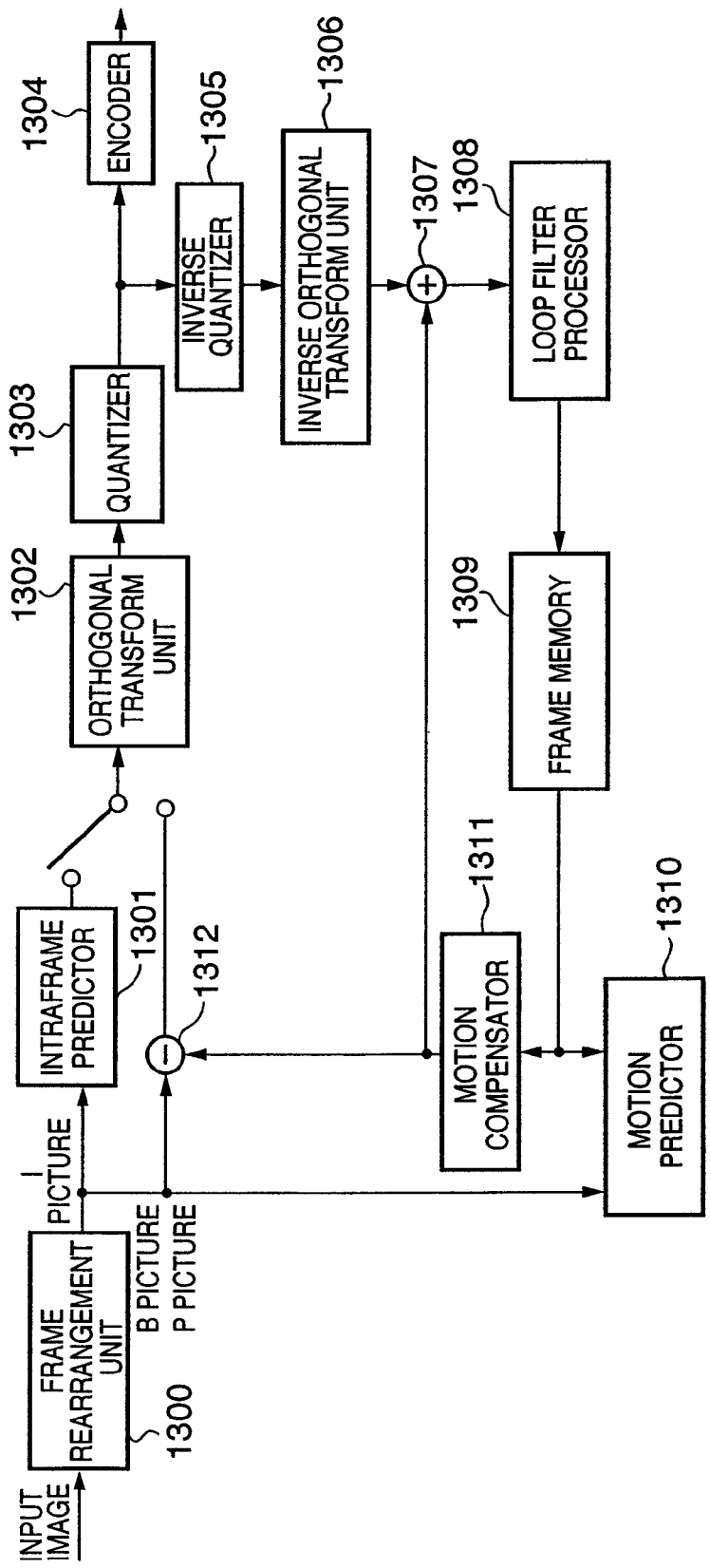
FIG. 13 is a block diagram showing an example of the configuration of a conventional image encoding apparatus.

In FIG. 1, the digital video camera of the present embodiment is comprised of a frame rearrangement unit 100, an intraframe predictor 101, an orthogonal transform unit 102, a quantizer 103, an encoder 104, an inverse quantizer 105, an inverse orthogonal transform unit 106 and an incrementer 107, and further comprises a loop filter processor 108, a frame memory 109, a motion predictor 110, a motion compensator 111 and a decrementer 112, that is, the components of the same name in FIG. 13 generalized as the fundamental configuration. In addition to the foregoing elements, the digital video camera of the present embodiment is also comprised of an image sensing unit (camera) 120, a camera information manager 121 and a frame selector 122.

Next, based on FIG. 1, is description is given of the processing flow. The image sensing unit 120 is comprised of a zoom lens, a zoom mechanism and an auto focus mechanism, a strobe, an image sensing element, an A/D converter, and the like, that is, the configuration for image sensing that a typical video camera has. The image sensing unit 120 picks up the image of a subject through the optical system and outputs image signals to the frame rearrangement unit 100 as digital data. In addition, as will be described later, the image sensing unit 120 outputs camera information to the camera information manager 121.

Here, the input image picture type image data processed in the order IBBPBBPB . . . . The frame rearrangement unit 100 rearranges the input image signals in a predetermined encoded order to be described later and outputs it. If the image to be encoded is an intraframe prediction image, then the intraframe predictor 101 generates a differential image, and if the image to be encoded is an interframe prediction image, then the decrementer 112 generates a differential image. The orthogonal transform unit 102 generates a frequency image and the quantizer 103 generates a quantized image.

By contrast, camera information is output to the camera information manager 121 from the image sensing unit 120. The camera information, in other words, is information relating to the state of the camera at the time the image is sensed, for which any of the following or any combination thereof can be used.

Information expressing the brightness of the subject, such as f-stop and shutter speed, the AGC (Automatic Gain Control) gain of the image sensing element, etc.
Lens zoom magnification, strobe flash state (ON/OFF)
State of auto focus
Anti-shake control motion information
Size of sensed image
White balance control state
State of ND (Neutral Density) filter
Image sensing mode In the present embodiment, the description is of a case in which the camera information is strobe flash information.

Figure 2:
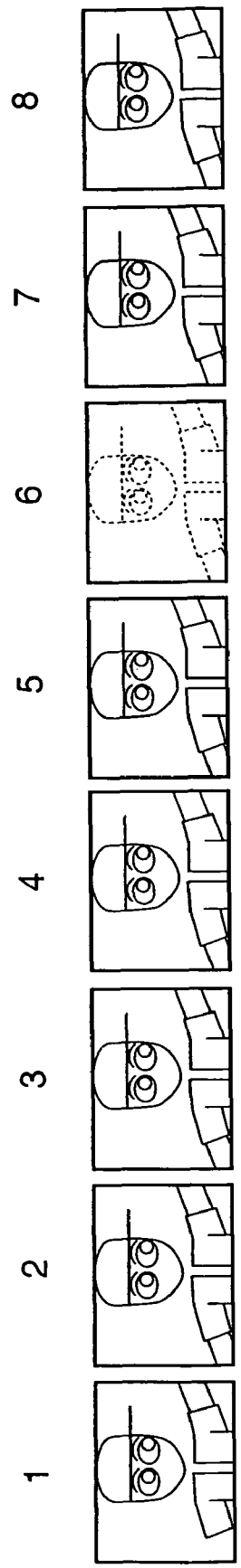
FIG. 2 is a diagram showing an example of an image in which a strobe is flashed.

In the image sensing unit 120 of the digital video camera of the present embodiment, in a case in which the user orders simultaneous sensing of a moving image and a still image or the like, it is possible to carry out the flashing of a strobe for the purpose of sensing a still image. FIG. 2 shows an example of an image sequence output to the frame rearrangement unit 100 from the image sensing unit 120 in a case in which image sensing of this sort is performed. In FIG. 2, frames 1 through 8 are arranged in chronological order, with frame 6 showing image sensing of a subject when illuminated by the flash of a strobe. Information of an image frame that corresponds to the time in which the strobe is flashed is input to the camera information manager 121 from the image sensing unit 120. The camera information manager 121 relates the flashing state of the strobe with the image frame.

When quantized image data is input from the quantizer 103, the frame selector 122 sends the image data to the inverse quantizer 105 for local decode purposes using basically the I frame and the P frame as the reference frame for calculating the motion vector.

Next, a detailed description is given of the control of the frame selector 122 based on FIGS. 3A-3C and FIGS. 4A-4C. FIGS. 3A, 3B and 3C are diagrams showing an image sequence composition as well as an encoded order and a frame memory 109 state. FIG. 3A shows the image data output from the image sensing unit 120 in temporal sequence order running from left to right, with chronologically later frames shown to the right. In addition, frame P10 is a P picture, and further, comprises image data sensed in a state in which the strobe is flashed. The fact that frame P10 is an image in which the strobe is flashed and sensed is managed by the camera information manager 121 as described above.

FIG. 3B shows the image sequence of FIG. 3A rearranged by the frame rearrangement unit 100. In the present embodiment, the frame rearrangement unit 100 rearranges the image sequence in a frame order in which the first P picture appearing after the B picture can be referenced. In other words, prior to encoding the B picture, the first P picture appearing chronologically later than that B picture is encoded.

The frame selector 122 outputs all the output data from the quantizer 103 to the encoder 104, but selectively outputs to the inverse quantizer 105 only that data which relates to the picture to be used as the reference image.

In the present embodiment, as described above, the I and P pictures are recorded in the frame memory and can be used as reference images, and therefore basically the I and P picture quantized data is sent to the inverse quantizer 105 in encoded order. However, the data output to the inverse quantizer 105 changes depending on the output from the camera information manager 121.

The entire sequence of locally decoding the quantized data using the inverse quantizer 105 and the inverse orthogonal transform unit 106, recording that decoded image data in the frame memory 109 and detecting the motion vector with the motion predictor 110 is the same as the conventional example described in FIG. 13. Therefore, a detailed description thereof is omitted. It should be noted that, in the present embodiment, the frame memory 109 is capable of recording three frames of image data as reference images.

A more detailed description of the operation of the frame selector 122 of the present embodiment is now given, using the example shown in FIG. 3C. As described above, the frame selector 122 basically selects an I or a P picture for output to the inverse quantizer 105 in encoded order. As a result, up until the moment at which picture B5 starts to be output from the quantizer 10, three frames I1, P4, P7 are selected, decoded and recorded in order in the frame memory 109.

A description is now given of encoding frame P10 in the state described above. Although the frame P10 input to the frame selector 122 is a P picture, as shown in the sixth frame in FIG. 2, it is an image sensed using a strobe. An image that is sensed using a strobe has low interframe continuity (low interrelation) with images sensed without using a strobe, and is unsuitable as a reference image for motion detection. Accordingly, the frame selector 122, when it determines from the output from the camera information manager 121 that frame P10 is an image sensed using a strobe, operates so as to not use frame P10 as a candidate image for the reference image, even though frame P10 is a P picture. Specifically, the frame selector 122 does not output frame P10 to the inverse quantizer 105 and does not record it in the frame memory 109.

Next, a description is given of encoding frame B8, which is encoded after frame P10, using FIGS. 4A-4C. As with FIGS. 3A-3C, FIG. 4A shows the order of images output from the image sensing unit 120, FIG. 4B shows the encoded order, and FIG. 4C shows the state of the frame memory.

By the above-described process, P10, which is a frame illuminated by the flashing of the strobe, is not stored in the reference frame memory. As a result, when encoding frame B8 after frame P10 as well, the data recorded in the frame memory remains as before I1, P4 and P7. As shown in FIG. 4C the motion predictor 110 performs motion prediction by block matching between frame B8 and frames I1, P4 and P7 recorded in the frame memory 109, thus calculating the motion vector and at the same time generating a compensated image with the motion compensator 111. The difference between the images is obtained based on the compensated image, and the method of encoding is as described using FIG. 13.

With the configuration described above, motion detection can be performed between what are likely to be more effective reference images, without making a reference image of a frame that has low interframe continuity as a moving image such as a subject illuminated by a strobe and is thus unsuitable as a reference image, thereby enabling encoding accuracy to be improved.

Figure 14:
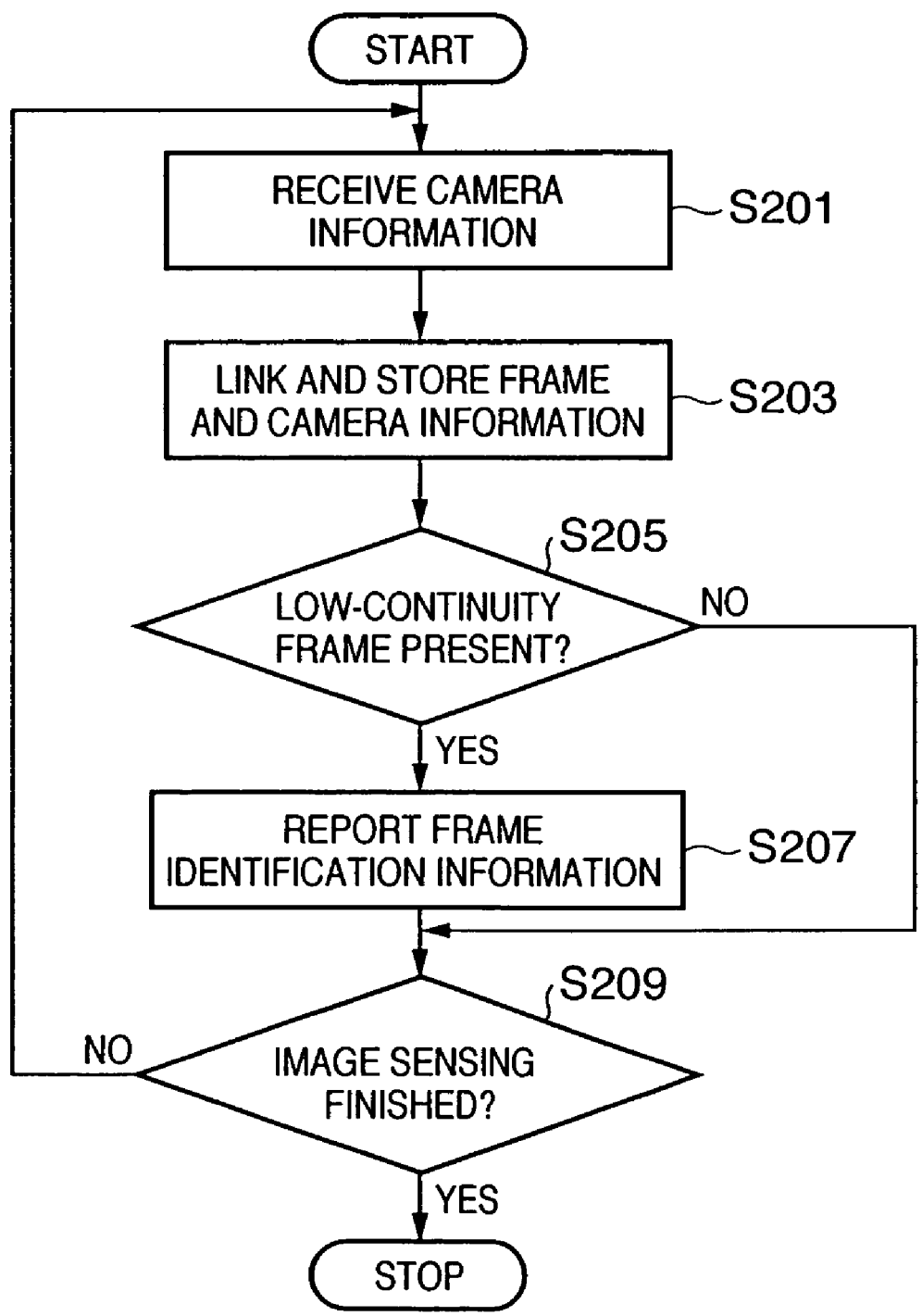
FIG. 14 is a flow chart illustrating the operation of a camera information manager in the first embodiment of the present invention.

FIG. 14 is a flow chart illustrating the operation of the camera information manager 121 of the present embodiment.

First, the camera information manager 121 receives camera information from the image sensing unit 120 (step S201), and links the image frame with the camera information for storage in a storage device, not shown (step S203). Then, a search is made to determine whether or not frames that are detectable and likely to be of low continuity judging from the camera information (that is, frames that should not be kept in the frame memory 109 as candidate images for reference images) are present. One such frame is a frame in which an image is sensed with the flashing of a strobe, for example. There are no special limitations on the detection method, provided that the detection method used permits prompt detection of the presence or absence of the flashing of the strobe, and permits detection by referring to camera information for a predetermined number of contiguous frames in the event that detection is by comparison of camera information for preceding frames and succeeding frames.

If frames that are likely to be of low continuity are not detected, then processing promptly proceeds to step S209. By contrast, if such frames are detected, then such frames are reported to the frame selector 122 (step S207) in the form of information by which the frame selector 122 can identify the frames, for example by frame number. Processing then proceeds to step S209. In step S209, if image sensing is not finished, processing returns to step S201, and if image sensing is finished, then processing terminates.

FIG. 15 is a flow chart illustrating the operation of the frame selector 122 of the present embodiment.

In step S101, the frame selector 122 receives unselected frame information that is the output of the camera information manager 121 while monitoring the quantized data. The frame numbers, for example, may constitute unselected frame information. As described above, the camera information manager 121 detects frames of low continuity based on the camera information successively received from the image sensing unit 120, and then successively reports to the frame selector 122 the numbers of the detected image frames as information that identifies image frames that are unsuitable as reference image candidate images Step S103 is a final determination step, in which if the process of encoding all the frames in the input moving image sequence is finished.

If encoding is not finished, then in step S105 it is determined whether or not the data has become quantized data for a new frame, accomplished, for example, by identifying the header information. While there is no change to a new frame, processing returns to step S101 and the process is repeated. Once the frame changes, in step S107 it is determined whether or not the new image frame that begins to be output from the quantizer 103 is a frame that has been reported as an unselected frame from the camera information manager 121, which can be accomplished, for example, by comparing the frame number contained in the header with the reported unselected frame numbers.

If the frame is one that has been reported as unselected, such as a frame in which the strobe is flashed, then processing proceeds to step S115 and an internal switch, not shown, of the frame selector 122 is switched so that the quantized data for that frame is output only to the encoder 104 without being selected.

By contrast, if the frame is one that has not been reported as an unselected frame, then in step S109 it is determined whether or not the frame is an I picture or a P picture, in other words, a picture that should be recorded in the frame memory 109 as a reference image candidate image. This determination also can be accomplished by referring to the header portion of the quantized data. Here, if the frame is an I picture or a P picture, then processing proceeds to step S111 and the internal switch, not shown, of the frame selector 122 is switched so that the quantized data for that frame is selected, added to the encoder 104 and output to the inverse quantizer 105.

If in step S109 the frame is a B picture (a picture that is not used as a reference image), then processing proceeds to step S115 and the frame is processed as an unselected frame. Step S113 is described later with reference to a first variation.

First Variation of the First Embodiment

It should be noted that although in the method described above the embodiment is configured so that an image sensed with the flashing of a strobe is never selected as a reference image candidate image regardless of what type of picture it is, alternatively the embodiment may be configured so that another frame is recorded in the frame memory.

FIGS. 5A-5C show an example of such a configuration. As with FIGS. 3A-3C and FIGS. 4A-4C, FIG. 5A shows the order of images output from the image sensing unit 120, FIG. 5B shows the encoded order and FIG. 5C shows the state of the frame memory. That the frame selector 122 does not add the frame P10, in which the strobe is flashed, to the reference frames is the same as the method described above. Here, the frame selector 122 does not add frame P10 to the reference frames. Instead, so as to record frame B9, sensed immediately prior to frame P10 (but following P10 in the encoded order), in the frame memory 109 as a reference image candidate image, the frame selector 122 selects the frame B9 quantized data and outputs it to the inverse quantizer 105. As a result, when encoding frame P13, which is the next frame to be encoded, it becomes possible to reference not only those frames that are slightly removed chronologically, such as frames P4, P7, but also those frames that are chronologically near as well, such as frame B9, enabling the accuracy of motion detection to be improved.

When implementing the first variation, when the frame in step S109 shown in FIG. 15 is a B picture, step S113 is executed and it is here determined whether or not the frame is a substitute frame (in terms of the above-described example, whether or not the frame is frame B9). Here, the determination of which frame is the substitute frame can be accomplished by the frame selector 122 storing the closest unselected frame and determining whether or not the frame number is the number of that frame minus 1.

Second Variation of the First Embodiment

In addition, like the flashing of the strobe, subject brightness information can similarly be utilized as camera information, and can be detected by the camera information manager 121 based on the level of the camera information (the brightness information) that in this case is output by the image sensing unit 120 and which changes depending on the brightness of the subject, such as the aperture setting of the optical system, the AGC gain of the image sensing element, and so forth. Specifically, by detecting changes over time in the brightness information, it is possible to detect frames of extremely different brightness, as when a strobe is flashed.

Other Variations of the First Embodiment

It should be noted that the basic idea of the present embodiment is to detect frames having low continuity contained in the sensed image sequence based on the camera information and to not keep such frames in the frame memory as reference image candidate images. Therefore, provided that frames having low continuity are detectable, methods that employ camera information other than that described above may be used.

In addition, in the method described above, it is noted that in general strobe image sensing is infrequent and that image frames in which the strobe is flashed are not to be made reference frames. However, viewed from the perspective of removing frames having low continuity from the candidate images for reference images, in a case in which the flashing of the strobe is very frequent, there are instances in which even an image in which the strobe is flashed may be useful as a reference image. In such instances, if the frequency with which the strobe is flashed exceeds a predetermined threshold, then matters may be configured so that even image frames illuminated by the flashing of the strobe are selected as reference image candidate images.

In addition, although in the present embodiment the camera information manager 121 that detects image frames unsuitable for use as reference images and the frame selector 122 that executes selection and non-selection are configured as separate units, these functions may be combined in a single unit.

As described above, the present embodiment detects images having low continuity based on the camera information and does not use such images as reference image candidate images, enabling motion vector detection accuracy and detection speed to be improved. As a result, the present embodiment makes it possible to achieve high-speed, low-encoding-volume moving image encoding.

Second Embodiment

In the first embodiment of the present invention, image frames not to be recorded in the frame memory are identified on the basis of the camera information, with frames likely to be of high continuity stored in the frame memory 109 as reference image candidate images.

A second embodiment is characterized by using the camera information to select images that should not be kept in the frame memory and which should be deleted first. In this embodiment as well, as with the first embodiment, the description proceeds using the example of a moving image compression-encoding apparatus equipped with an image sensing capability.

Figure 6:
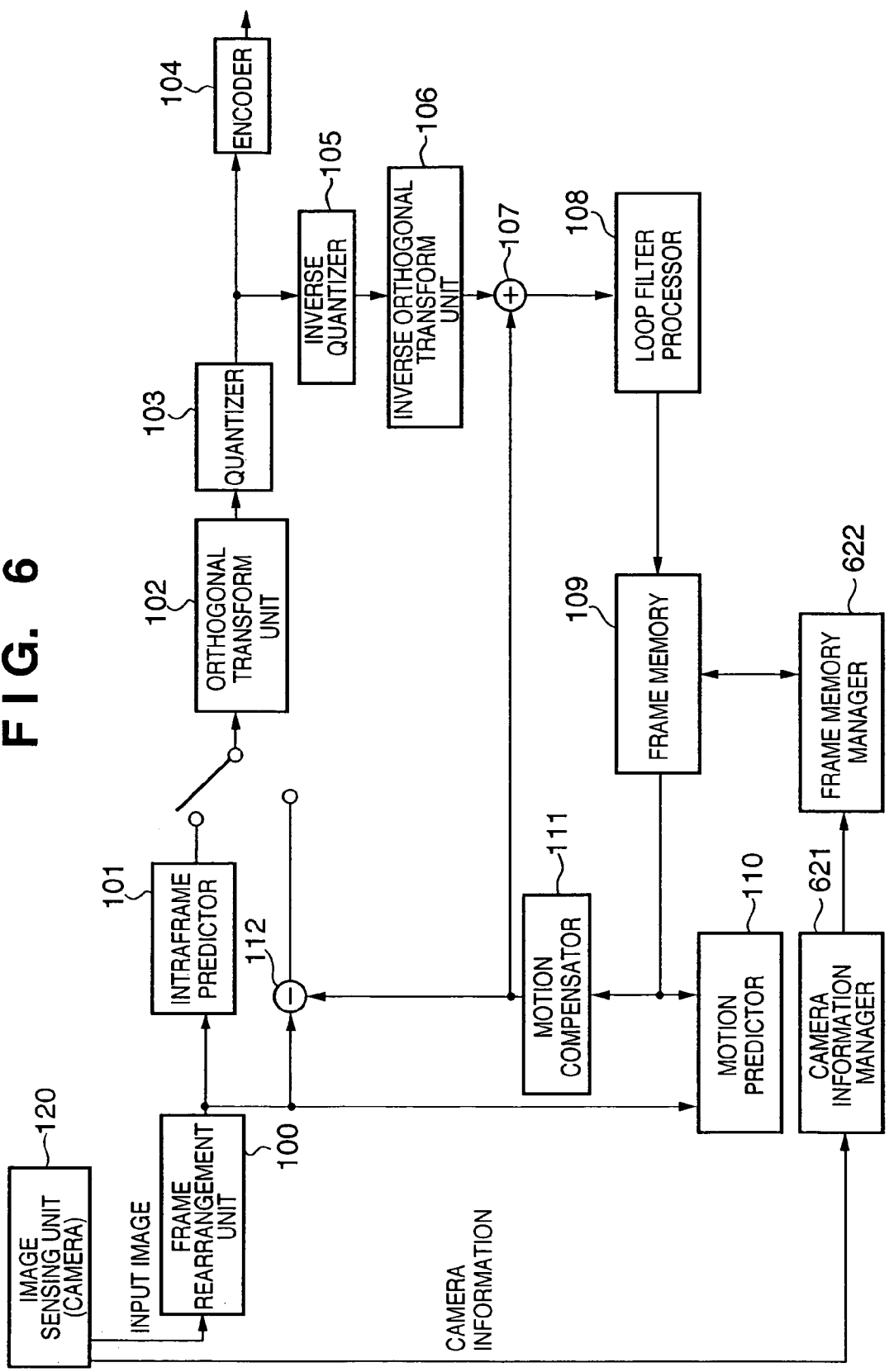
FIG. 6 is a block diagram showing an example of the configuration of a video camera as a moving image encoding apparatus according to a second embodiment of the present invention.

FIG. 6 is a block diagram showing an example of the configuration of a video camera as the moving image compression-encoding apparatus of the present embodiment, with the same elements as the first embodiment given the same reference numerals.

In FIG. 6, because the distinctive feature of the present embodiment is the use of a camera information manager 621 and a frame memory manager 622 to manage the frame memory, a description is given only of the camera information manager 621 and the frame memory manager 622. It should be noted that, in this embodiment as well, the frame memory 109 is capable of recording three frames of image data as reference image candidate images.

The frame memory manager 622 manages the image data recorded in the frame memory 109. For example, in a state in which three frames of image data are recorded in the frame memory 109, assume that new image data to be recorded in the frame memory 109 is input. In this case, of the frames stored in the frame memory 109, the oldest frame (that is, the frame with the smallest frame number) is deleted and in its place the newly input frame is recorded in the frame memory 109 as a candidate image.

As with the camera information manager 121 of the first embodiment, camera information is input from the image sensing unit 120 to the camera information manager 621. In order to simplify the description and the understanding of the present embodiment, the description uses the example of an instance in which, of all the camera information, the state of flashing of the strobe is used.

As with the camera information manager 121 of the first embodiment, the camera information manager 621 links the image frames in the frame memory 109 with the camera information. In other words, the camera information manager 621 identifies which of the images recorded in the frame memory 109 are images in which the strobe is flashed.

A summary description is now given of methods of adding images to and deleting images from the frame memory 109 in the configuration described above, using FIGS. 7A-7D and FIG. 8.

Figure 7:
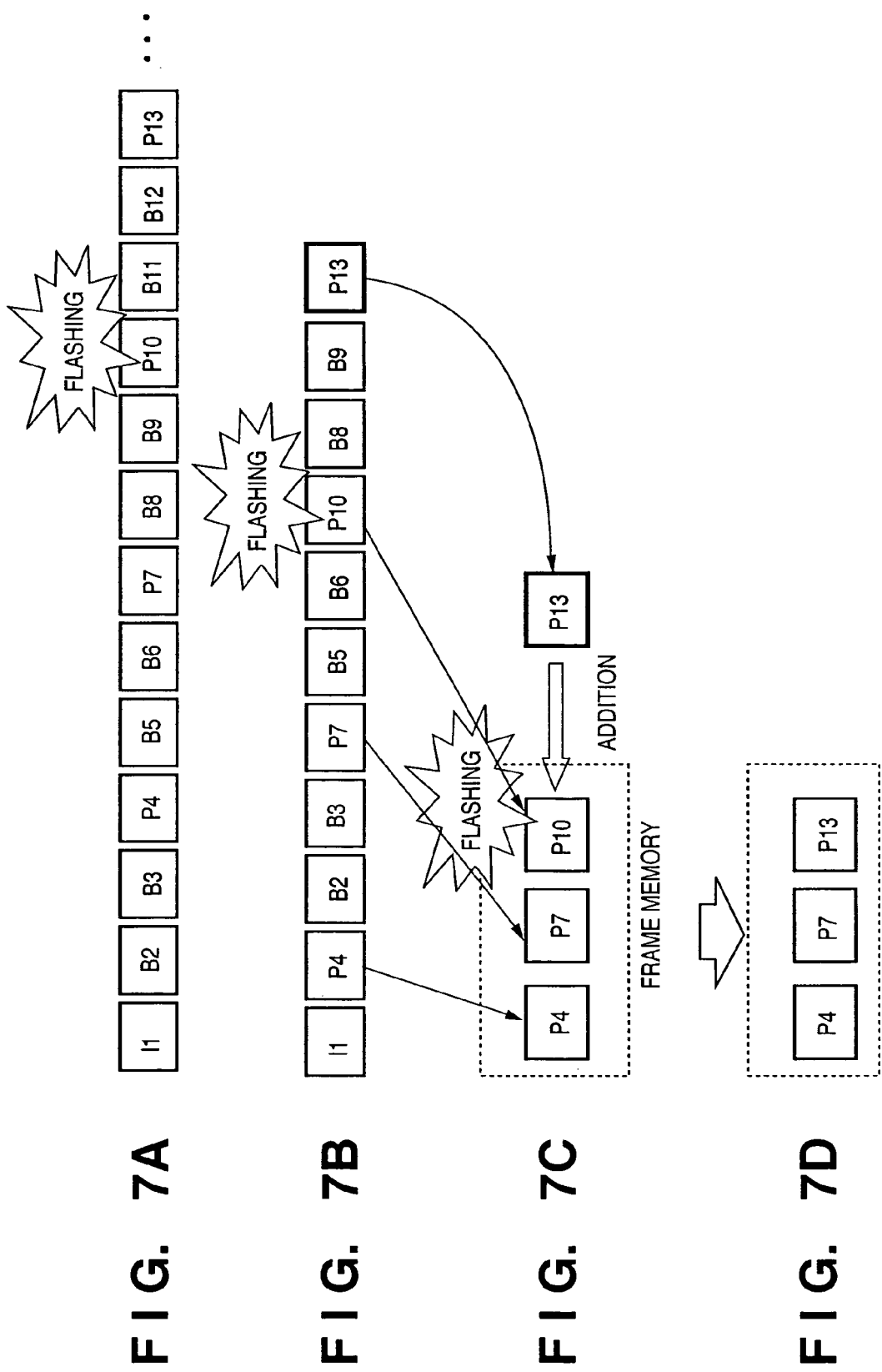
FIGS. 7A, 7B, 7C and 7D are diagrams showing an image processing order and frame memory content according to the second embodiment of the present invention.

FIG. 7A shows the order of the images output from the image sensing unit 120 and FIG. 7B shows the encoded order. As with the first embodiment, the encoded order is such that the B frame can refer to the chronologically immediately succeeding P frame. Frame P10 is an image in which the strobe is flashed.

FIG. 7C shows the state of the frame memory 109 when encoding frame P13. In this case, three frames encoded before P13 (P4, P7, P10) are recorded in the frame memory 109. In addition, the camera information manager 621 identifies P10 as an image in which the strobe is flashed.

In such a state, the three frames to be encoded after P10 (B8, B9, P13) are encoded after referencing the frame memory 109 images (P4, P7, P10) and performing motion detection and motion compensation. When encoding frame P13, because frame P13 is a P picture, it is locally decoded and an attempt is made to record it in the frame memory 109 as a reference image candidate image.

However, since the frame memory 109 has no empty space, as described above the frame memory manager 622 normally deletes the chronologically oldest image data (the earliest sensed image data) from the frame memory 109 first (in this case P4) and then records the new reference image data (P13) in the frame memory 109.

However, based on the information of the camera information manager 621, when there is an image or images that should be deleted in the frame memory 109 first (in this case, an image in which the strobe is flashed), an image in which the strobe is flashed is deleted from the frame memory 109 first. In this example, as shown in FIG. 7D, frame P10 is deleted before frame P4, which is chronologically the oldest image data, and frame P13 is added to the frame memory 109.

The operation of the camera information manager 621 of the present embodiment may be the same as that of the first embodiment illustrated in FIG. 14, detecting frames likely to be of low continuity from the camera information and reporting that identification to the frame memory manager 622.

Figure 16:
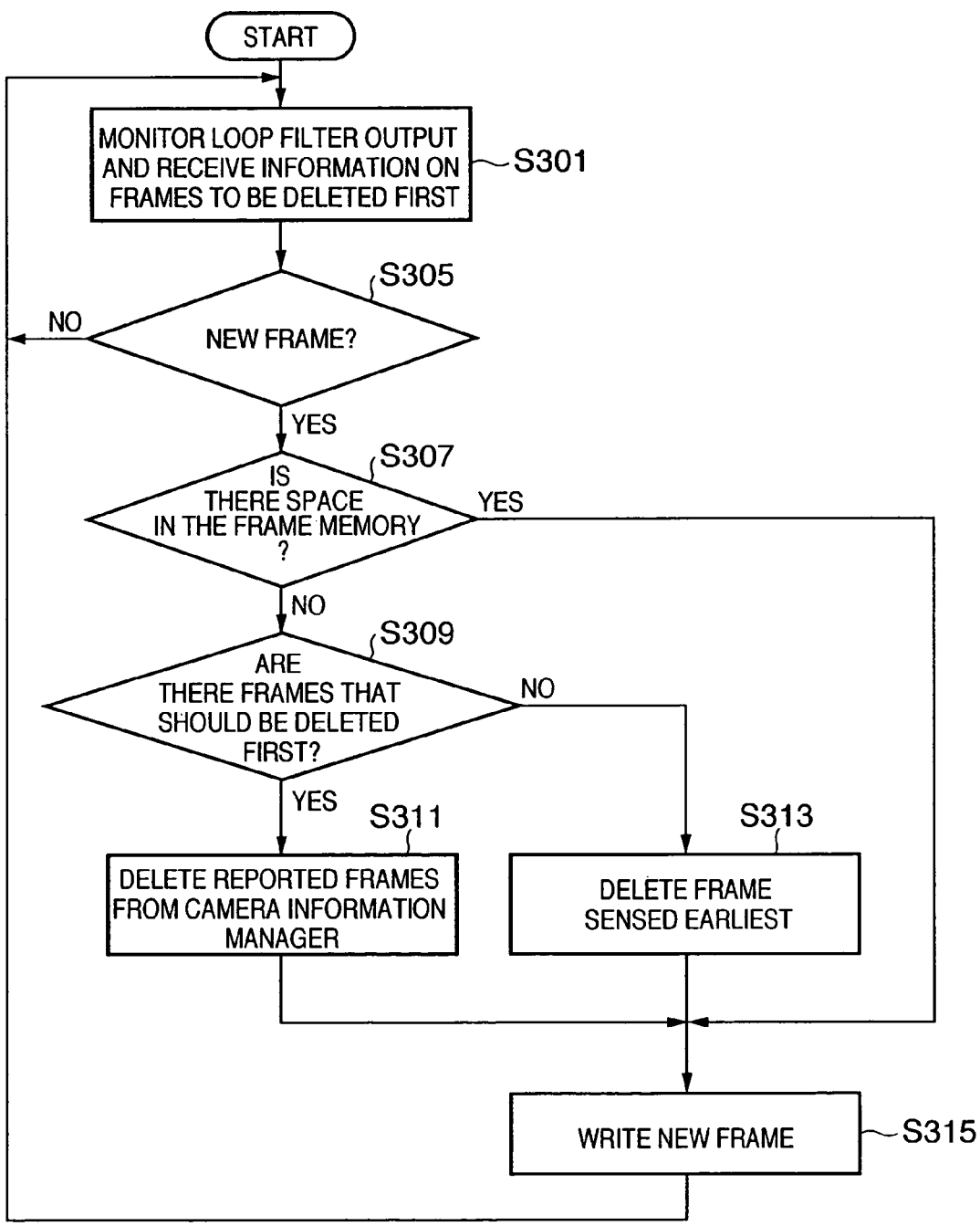
FIG. 16 is a flow chart illustrating the operation of a frame selector in the second embodiment of the present invention.
Figure 17:
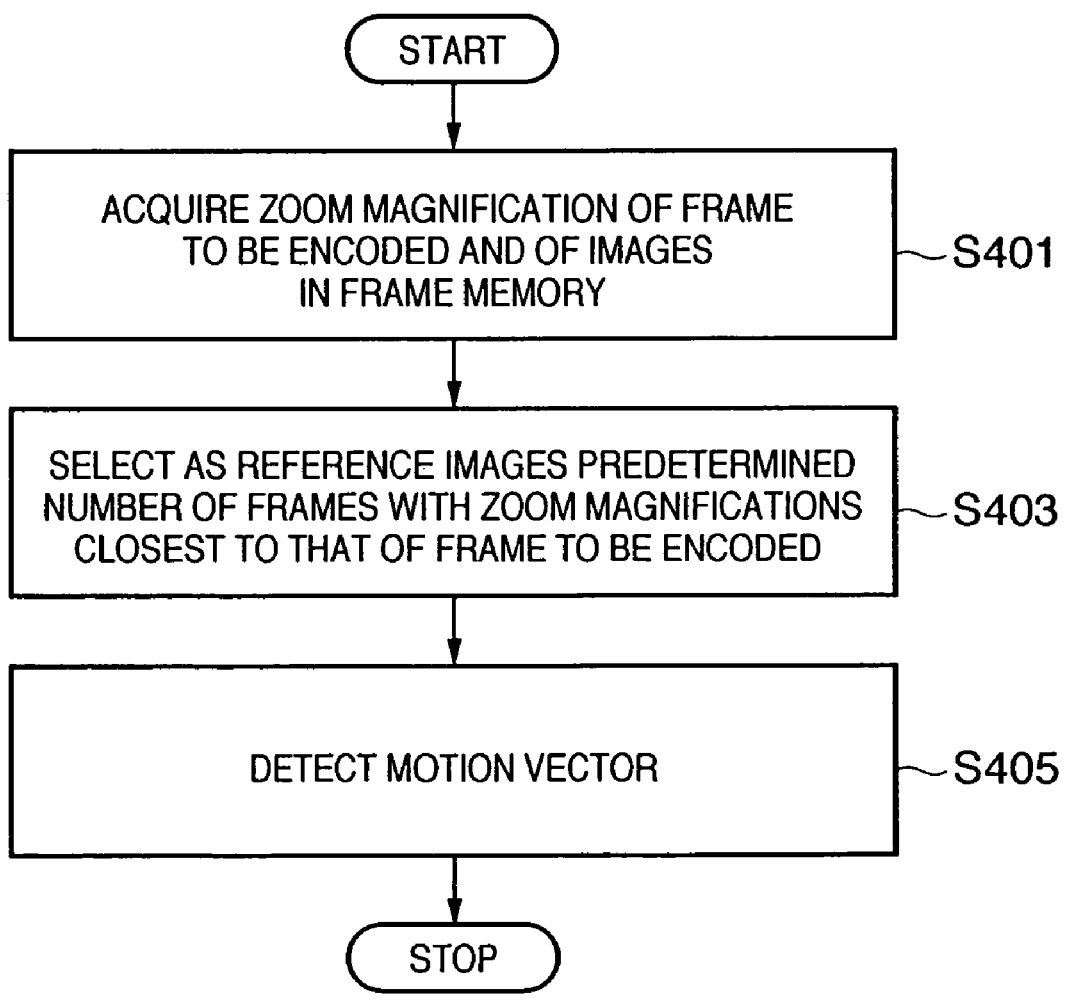
FIG. 17 is a flow chart illustrating the operation of a motion predictor in the third embodiment of the present invention.

FIG. 16 is a flow chart illustrating the operation of the frame memory manager 622 of the present embodiment.

First, in step S301, while monitoring the output of the loop filter 108 the frame memory manager 622 receives frame identification information from the camera information manager 621. If a new frame is output from the loop filter 108 (Y in step S305), a check is made to determine whether or not there is empty space in the frame memory 109 (step S307). If there is space, then in step S315 the new frame is written to the frame memory 109 in the usual way.

By contrast, if there is no space in the frame memory 109, then in step S309, of the images that are currently recorded in the frame memory 109, it is confirmed whether or not there is a frame reported as a frame that should be deleted first from the camera information manager 621. If there is such a reported frame present, then in step S311 that frame is deleted, after which the new frame is written to the frame memory 109 in step S315. If there is a plurality of frames that have been reports present in the frame memory 109, then, for example, of these frames the frame that has been sensed earliest is deleted.

In this embodiment, if there is a frame in the frame memory 109 in which the strobe is flashed and the frame sensed, that frame is deleted from the frame memory 109 first. However, the embodiment may be configured so that the frame time information and whether or not the strobe is flashed is weighted and the frames that are chronologically closest to the encoded data are not deleted.

In addition, even if the frame in question is one in which the strobe is flashed, if the number of times that that frame has been referenced in the past for motion prediction purposes exceeds a predetermined threshold, then that frame may be removed from the frames to be deleted first. In that case, the number of times referenced is stored in the frame memory manager 622 for each frame, and when the determination performed in step S309 shown in FIG. 16 is made, a frame that has been referenced more than a predetermined number of times may be processed as a frame for which there is no report.

In addition, although in this embodiment the state of the flashing of the strobe is used as the camera information, such is merely one example of the type of camera information that may be used. As with the first embodiment, the apparatus may be one that utilizes information other than the flashing of the strobe, such as, for example, information relating to the brightness of the subject.

With such a configuration, images that are not suitable for use as reference images, such as images of low continuity in which the subject is illuminated by a strobe, are no longer kept for long periods of time as reference images in the frame memory. Accordingly, the second embodiment enables the frame memory to be utilized efficiently with a different method from that of the first embodiment, making it possible to achieve improved encoding accuracy and reduced encoding volume.

Third Embodiment

A third embodiment is characterized by determining which of the image frames recorded in the frame memory are to be detected based on the camera information. In this embodiment as well, as with the embodiments described above, the description proceeds using the example of a moving image compression-encoding apparatus equipped with an image sensing capability.

Figure 8:
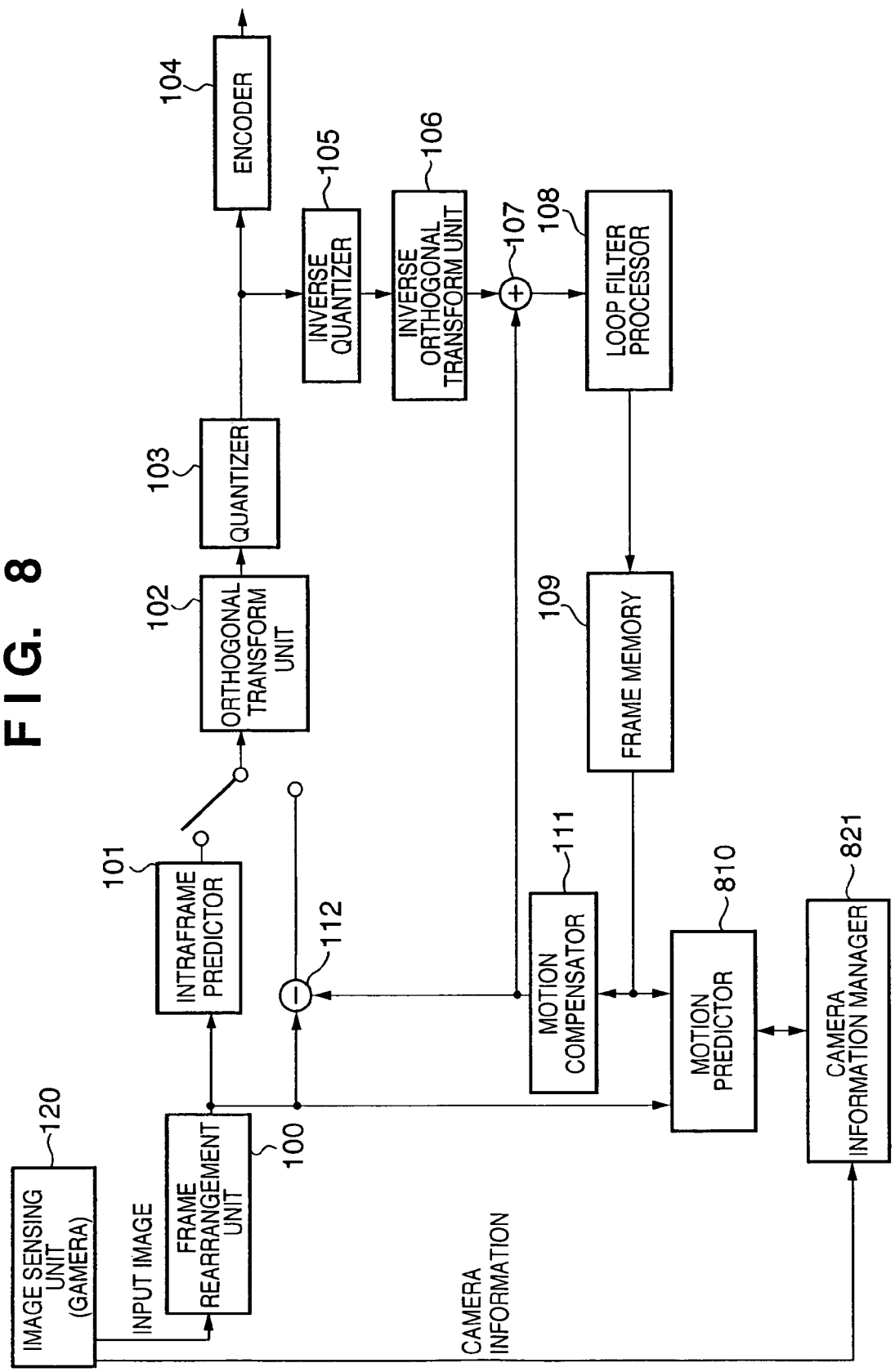
FIG. 8 is a block diagram showing an example of the configuration of a video camera as a moving image encoding apparatus according to a third embodiment of the present invention.

FIG. 8 is a block diagram showing an example of the configuration of a video camera as the moving image compression-encoding apparatus of the present embodiment, with the same elements as the first embodiment given identical reference numerals.

As shown in FIG. 8, because the distinctive feature of this embodiment is the operation of the camera information manager 821 and the motion predictor 810, a description is given only of these elements. It should be noted that, in the present embodiment, the frame memory 109 is capable of recording five frames of images.

As with the embodiments described above, camera information from the image sensing unit 120 is input to the camera information manager 821. In this embodiment, the description uses the example of a case in which the zoom magnification is the camera information. The camera information manager 821 links the zoom magnification of the image frames in the frame memory 109 and the image frames currently being encoding with the images. The motion predictor 810 acquires the zoom magnification of each and every image frame in the frame memory 109 and the zoom magnification of the image frames currently being encoded from the camera information manager 821. Then, from among the five frames stored in the frame memory 109, the motion predictor 810 selects two frames having zoom magnifications close to the zoom magnification of the frame to be encoded currently. Using these two frames, the motion predictor 810 then detects the motion vector by, for example, a process of block matching with the frame to be encoded.

A further description is now given of the processing performed by the motion predictor 810, using the flow chart shown in FIGS. 9A-9C and FIG. 17. FIG. 9A shows the order of images output from the image sensing unit 120 and FIG. 9B shows the encoded order. The encoded order is the same as in the first and second embodiments. In addition, FIG. 9C shows the state of the frame memory 109.

Here, a description is given of an instance in which frame B11 is the frame to be encoded. When frame B11 is the frame to be encoded, five frames of image data—I1, P4, P7, P10 and P13—are recorded in the frame memory 109. If block matching with frame B11 is performed for all five of these frames, the amount of processing increases tremendously. Accordingly, in the present embodiment, the zoom magnifications for the frame to be encoded B11 and the frame data in the frame memory 109 are acquired from the camera information manager 821 (step S401). Then, a predetermined number of frames (here, two) with zoom magnifications closest to that of the frame to be encoded B11 are selected (step S403). In the example shown in FIG. 9C, frame P10, which has a zoom magnification identical to the zoom magnification of frame B11 (3.0), and frame P7, which has the next closest zoom magnification (2.8) are selected. Then, using the selected reference images, detection of the motion vector is performed using block matching or some other well known method (step S405).

The change in the image caused by the zoom is not a perfectly horizontal or vertical change, and therefore the accuracy of a motion vector that is detected by block matching of images in which the same subject is sensed at different zoom magnifications is not very high. Therefore it is possible to reduce the volume of computation involved by excluding frames whose zoom magnifications differ by more than a predetermined amount from consideration as references.

It should be noted that, if there is a plurality of frames of the same zoom magnification in the frame memory 109, the apparatus selects those frames that are the nearest in time to the frame to be encoded.

In addition, instead of acquiring the zoom magnifications for the frames in the frame memory 109 when detecting the motion vector, the zoom magnifications may be acquired from the camera information manager 821 and stored when a new frame is written to the frame memory 109.

It should be noted that, in this embodiment, a description is given of a method that selects two frames from among the five image frames recorded in the frame memory 109. Alternatively, however, provided that the frames to be referenced are limited by the camera information, an arrangement may be used in which, for example, only the single frame with a zoom magnification that is the closest to the zoom magnification of the frame to be encoded is selected and referenced. In addition, a method may be adopted in which frames whose zoom magnifications differ by more than a predetermined amount are excluded from the motion vector search.

In addition, although in the present embodiment a description is given only of an example in which the frame to be used for reference is selected solely according to the zoom magnification, alternatively, since the differences between the frame to be encoded and the frames that are chronologically closest to the frame to be encoded decrease, these frames may be assigned weighted values in terms of their closeness in time and in zoom magnification to the frame to be encoded and a comprehensive determination may be made based on the weighted values. In addition, a method may be used that combines zoom magnification with other camera information in order to identify the frames to be used for reference.

In addition, the foregoing description concerns only an example in which the camera information is the zoom magnification. Alternatively, however, any information that, of all the camera information output from the image sensing unit, changes depending on the state of the subject or of the image sensing system, for example AU (Auto Exposure) information or image sensing unit tilt/pan control information, may be used instead of the zoom magnification.

In addition, the present embodiment can also be implemented in combination with the first embodiment or the second embodiment.

Fourth Embodiment

A fourth embodiment of the present invention identifies the reference frame to be used in motion detection from among the image frames recorded in the frame memory 109 based on the camera information obtained from the image metadata.

FIG. 10 is a block diagram showing an example of the configuration of a moving image compression-encoding apparatus of the present embodiment, in which elements that are the same as those in the first embodiment are given the same reference numerals.

As shown in FIG. 10, the distinctive feature of the present embodiment is the operation of a metadata analyzer 1020, a camera information manager 1021 and a motion predictor 1010, and therefore a description is given of only these elements. It should be noted that, in this embodiment, the frame memory 109 is capable of recording five frames of images.

A description is now given of the steps in the processing performed. The metadata analyzer 1020 receives digitized image data as input images from an external device like the image sensing unit 120 described above, for example, and after extracting and analyzing the metadata from the input image sends image data to the frame rearrangement unit 100.

Metadata here means information relating to the image data, and includes everything from image size and image data time to camera information at the time the image is sensed. It should be noted that, as with the third embodiment, the present embodiment also can record five frames of image data in the frame memory 109.

FIGS. 11A-11C show the order of processing of the input image data and the structure of the data that is to be recorded in the frame memory. FIG. 11A shows the image types of the input images to be processed, FIG. 11B shows the order of the frames after rearrangement by the frame rearrangement unit 100. In addition, the frame rearrangement unit 100 of the present embodiment rearranges the frames in such a way that the B picture can reference two chronologically later P pictures. For example, prior to encoding frame B8, P10 and P13, which chronologically come after B8, are encoded first. As a result, when the motion predictor 1010 predicts the motion of frame B8, the images that are shown in FIG. 11C are recorded in the frame memory 109. Frame B8 is a B picture, and therefore it is possible to perform motion prediction by referencing frames I1, P4 and P7, which chronologically come before frame B8, and frames P10 and P13, which chronologically come after frame B8.

The metadata analyzer 1020 extracts the camera information from the metadata of the input image data and outputs the camera information to the camera information manager 1021. In this embodiment, the description concerns an example in which the camera information is information relating to the brightness of the subject (specifically, the f-stop, for example, to which the shutter speed may be added as necessary, and the image sensing element AGC gain and the like as well). The camera information manager 1021 links the image to be encoded and the image data recorded in the frame memory 109 with the subject brightness information. Here, I pictures and P pictures are recorded in the frame memory 109, and therefore the camera information manager 1021 can identify frames in the frame memory 109 on the basis of the picture order IBBPBBPB . . . . Of course, it is also possible to access the frame memory 109 and obtain confirmation from the frames actually recorded therein.

Figure 12A:
FIGS. 12A, 12B and 12C are diagrams showing images to be processed and frame memory content according to a fourth embodiment of the present invention.
Figure 12B:
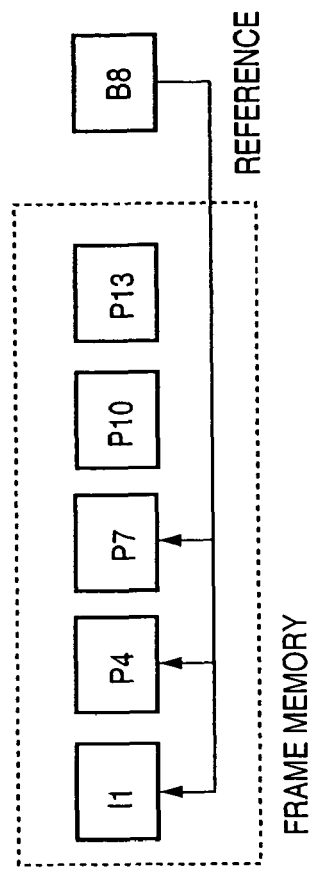
Figure 12C:
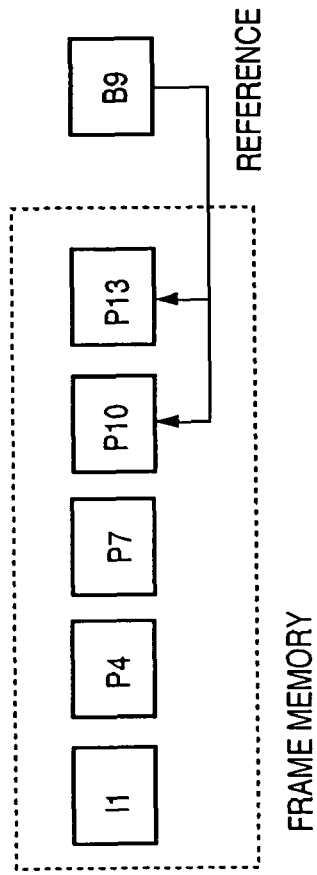

A detailed description is now given of the processing performed by the camera information manager 1021, using FIGS. 12A-12C. FIG. 12A specifically shows the input images shown in FIG. 11A. In this example, the image changes abruptly from frame B8 to frame B9, and the brightness of the subject also changes abruptly. It should be noted that, although not shown, frames I1-B4 are the same images as frames B5-B8.

The camera information manager 1021 detects a scene change between frames B8 and B9 from the change in brightness contained in the camera information from the metadata analyzer 1020. Then, scene change information, for example, the frame number of the first frame deemed to be a scene change (that is, the beginning frame number of the scene) or the like, is output to the motion predictor 1010.

Next, the motion predictor 1010, when encoding frame B8, for example, performs a motion vector search on only those frames of the same scene as the scene shown in frame B8. For example, consider a case in which the scene change information is the beginning frame number. From among the candidate images in the frame memory 109, the motion predictor 1010 selects a reference image from among the frames in an interval from the closest scene beginning frame that is chronologically earlier than the frame to be encoded to the frame just before the closest scene beginning frame that is chronologically later than the frame to be encoded. In other words, the motion predictor 1010 is set to exclude from the motion vector search those images of scenes that are different from the scene shown in frame B8 and for which the difference between images would be large. In the example of this case, as shown in FIG. 12B, frames I1, P4 and P7 are referenced in the search for the motion vector.

When frame B9 is encoded after encoding frame B8, because frame B9 itself is the scene beginning frame, the images of frames P10 and later, which come after the scene change, are referenced in the search for the motion vector. That is, as shown in FIG. 12C, the motion vector is obtained from frames P10 and P13.

The operation of the camera information manager 1021 of the present embodiment is equivalent to changing the operation of step S205 and the processing of the camera information manager 121 in the first embodiment described with reference to FIG. 14. Specifically, in step S205, instead of identifying frames of low continuity, the operation of the camera information manager 1021 may be configured so as to carry out detection of the lead frame of a scene by the method described above.

Figure 18:
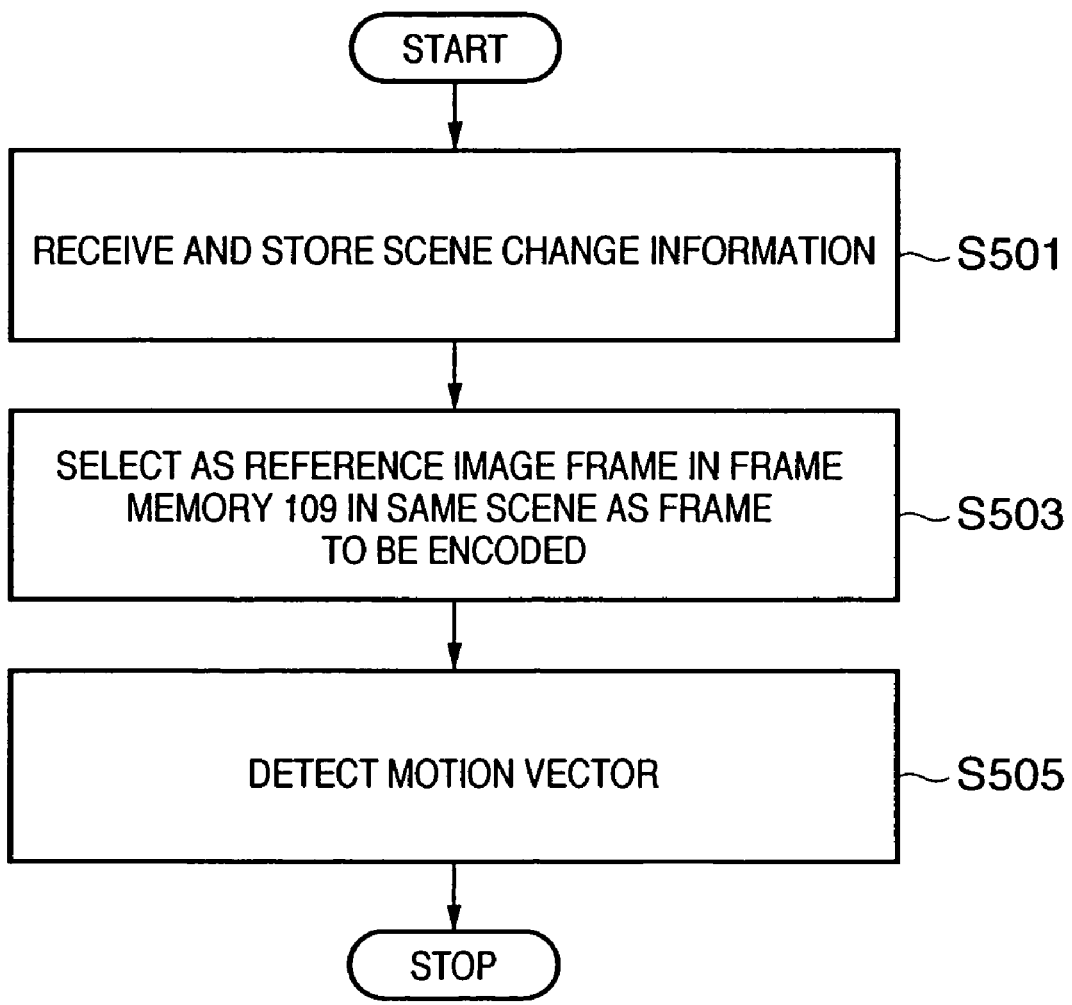
FIG. 18 is a flow chart illustrating the operation of a motion predictor in the fourth embodiment of the present invention.

A description is now given of the operation of the motion predictor 1010 of the present embodiment, using the flow chart shown in FIG. 18.

First, in step S501, the motion predictor 1010 receives scene change information from the camera information manager 1021 and stores it in a storage device, not shown. Next, from among the candidate images stored in the frame memory 109 the motion predictor 1010 selects frames contained in a scene that is the same as the scene shown in the frame to be encoded as reference images (step S503). Then, the motion predictor 1010 detects the motion vector using these reference images and a well known method (step S505).

It should be noted that although in this embodiment there is no image sensing unit and the camera information is obtained from the metadata of the image data, as described with the first, second and third embodiments, it is possible to provide an image sensing unit and to obtain the camera information from the image sensing unit. In addition, in the first through third embodiments described above, matters may be configured so that the camera information is obtained from the metadata of the image data.

It should be noted that although in the present embodiment a description is given only of an instance in which the brightness information is used as the camera information that detects a scene change, any information that enables the camera information manager to identify a switch in scene of the input images may be used as the camera information, for example the image sensing time or the like (detectable by the continuity of time).

As described above, the present embodiment detects a change in scene from the camera information and selects the reference images to be used in the detection of the motion vector from among a plurality of candidate images based on the scene change, thus eliminating needless calculations for the detection of the motion vector by the motion predictor 1010 and enabling the volume of calculations to be reduced.

Other Embodiments

It should be noted that the invention also includes a case in which the same functions as those of the present invention are achieved by supplying a software program that implements the functions of the foregoing embodiments directly or indirectly, or by using wire/wireless communications, to a system or apparatus having a computer capable of executing the program, with the computer of the system or apparatus then executing the program thus supplied.

Accordingly, since a computer implements the processing functions of the present invention, the program code supplied to and installed in the computer itself also achieves the present invention. In other words, the computer program for implementing the functional processes of the invention is itself also within the scope of the present invention.

In that case, so long as the system or apparatus has the functions of the program, the program may be executed in any form, such as an object code, a program executed by an interpreter, or scrip data supplied to an operating system.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network, and the program data file is downloaded to a connected client computer. In this case, the program data file may be divided into a plurality of segment files and the segment files distributed among different servers.

In other words, a server device that downloads, to multiple users, the program data files for implementing the functional processes of the present invention by computer, is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases in which the aforementioned functions according to the embodiments are implemented by a computer executing the read program, an operating system or the like running on the computer may perform all or a part of the actual processing based on the instructions of that program, so that the functions of the foregoing embodiments can be implemented by this processing.

Furthermore, after the program read from the storage medium is written to a function expansion board inserted in the computer or to a memory provided in a function expansion unit connected to the computer, a CPU or the like mounted on the function expansion board or function expansion unit may perform all or a part of the actual processing, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-302064 filed on Oct. 15, 2004, which is hereby incorporated by reference herein.

What is claimed is:

1. A digital video camera that encodes a moving image according to an encoding method where not all I pictures and P pictures are necessarily used as reference images, the digital video camera comprising:
   an image sensing unit configured to pick up a plurality of image frames of a subject and generate camera information relating to a state of the digital video camera of each of the plurality of image frames as each image frame is being picked up, and generate the moving image including the plurality of image frames;
   an intra-picture predicting encoding unit configured to encode an image frame of the generated moving image based on an intra-picture prediction and generate an I picture;
   a motion information detecting unit configured to detect motion information of the image frame of the generated moving image to be encoded using at least one of the reference images;
   an inter-picture prediction encoding unit configured to encode a difference between (i) the image frame of the generated moving image to be encoded and (ii) a predicted image frame generated based on the motion information of the image frame to be encoded, which is detected by the motion information detecting unit, and generate a P picture or a B picture;
   a storage unit configured to store decoded images, which are obtained by decoding the I picture generated by the intra-picture prediction encoding unit and the P picture generated by the inter-picture prediction encoding unit, respectively, as candidate images of the reference images;
   a camera information manager unit configured to receive the camera information of each of the plurality of image frames of the moving image and detect an image frame having low inter-frame continuity based on the camera information of the respective image frame; and
   a selecting unit configured to select decoded images to be stored in the storage unit as the candidate images so that decoded images obtained by decoding I pictures or P pictures, which are obtained by encoding image frames detected by the camera information manager unit as image frames having low inter-frame continuity, are not stored in the storage unit,
   wherein the motion information detecting unit obtains the at least one reference image from among a plurality of decoded images selected by the selecting unit and stored as the candidate images in the storage unit.

2. The digital video camera according to claim 1, wherein if a decoded image is obtained by decoding the I picture or the P picture, which is detected by the camera information manager unit as an image frame having low inter-frame continuity, and also if an image frame from which a B picture immediately before the I picture or the P picture is encoded is not detected by the camera information manager unit as an image frame having low inter-frame continuity, the selecting unit selects a decoded image obtained by decoding the B picture immediately before the I picture or the P picture as the candidate image.

3. The digital video camera according to claim 1, wherein:
   the camera information contains the presence or absence of flashing of a strobe of each of the image frames, and
   the camera information manager unit detects an image frame having low inter-frame continuity based on the presence or absence of strobe flashing-obtained from the camera information of the respective image frame.

4. The digital video camera according to claim 1, wherein:
   the camera information contains brightness information of the subject of each of the plurality of image frames of the moving image, and
   the camera information manager unit detects an image frame having low inter-frame continuity based on a variation of brightness of the subject between image frames obtained from the camera information of the respective image frames.

5. The digital video camera according to claim 1, wherein the camera information include at least one of brightness information of the subject, gain of the image sensing unit, lens zoom magnification, strobe flash state, state of auto focus, anti-shake control motion information, size of sensed image, white balance control state, state of neutral density filter, or an image sensing mode.

6. A control method of encoding a moving image according to an encoding method where not all I pictures and P pictures are necessarily used as reference images for a digital video camera having an image sensing unit configured to pick up a plurality of image frames of a subject and generate camera information relating to a state of the digital video camera of each of the plurality of image frames as each image frame is being picked up, and generate the moving image including the plurality of image frames, the digital video camera further including a camera information manager that receives the camera information of each of the plurality of image frames of the moving image, the control method comprising:
   an intra-picture predicting encoding step of encoding an image frame of the generated moving image based on an intra-picture prediction and generating an I picture;
   a motion information detecting step of detecting motion information of the image frame of the generated moving image to be encoded using at least one of the reference images;
   an inter-picture prediction encoding step of encoding a difference between (i) the image frame of the generated moving image to be encoded and (ii) a predicted image frame generated based on the motion information of the image frame to be encoded, which is detected in the motion information detecting step, and generating a P picture or a B picture;
   a storage step of storing decoded images, which are obtained by decoding the I picture generated in the intra-picture-prediction encoding step and the P picture generated in the inter-picture prediction encoding step, respectively, as candidate images of the reference images into a storage unit;
   a detection step of receiving the camera information of each of the plurality of image frames of the moving image and detecting an image frame having low inter-frame continuity based on the camera information of the respective image frame, with the camera information manager unit; and a selecting step of selecting decoded image to be stored in the storage unit as the candidate images so that decoded images obtained by decoding I pictures or P pictures, which are obtained by encoding image frames detected in the detection step as image frames having low inter-frame continuity, are not stored in the storage unit, wherein the motion information detecting step obtains the at least one reference image from among a plurality of decoded images selected in the selecting step and stored as the candidate images in the storage unit.

7. The method according to claim 6, wherein if a decoded image is obtained by decoding the I picture or the P picture, which is detected in the detection step as an image frame having low inter-frame continuity, and also if an image frame from which a B picture immediately before the I picture or the P picture is encoded is not detected in the detection step as an image frame having low inter-frame continuity, the selecting step selects the decoded image obtained by decoding the B picture immediately before the I picture or the P picture as the candidate image.

8. The method according to claim 6, wherein:
the camera information contains the presence or absence of flashing of a strobe of each of the plurality image frames of the moving image, and
the detecting step an image frame having inter-frame continuity based on the presence or absence of strobe flashing obtained from the camera information of the respective image frame.

9. The according to claim 6, wherein:
the camera information contains brightness information of the subject of each of the plurality of image frames of the moving image, and
the detection step detects an image frame having inter-frame continuity based on a variation of brightness of the subject between image frames obtained from the camera information of the respective image frames.

10. The method according to claim 6, wherein the camera information include at least one of brightness information of the subject, gain of the image sensing unit, lens zoom magnification, strobe flash state, state of auto focus, anti-shake control motion information, size of sensed image, white balance control state, state of neutral density filter, or an image sensing mode.

11. A digital video camera that encodes a moving image according to an prediction coding method using a reference image, the digital video camera comprising:
an image sensing unit configured to pick up a plurality of image frames of a subject and generate the moving image including the plurality of image frames;
an intra-picture predicting encoding unit configured to encode an image frame of the generated moving image based on an intra-picture prediction and generate an I picture;
a motion information detecting unit configured to detect motion information of the image frame of the generated moving image to be encoded using at least one of reference images;
an inter-picture prediction encoding unit configured to encode a difference between (i) the image frame of the generated moving image to be encoded and (ii) a predicted image frame generated based on the motion information of the image frame to be encoded, which is detected by the motion information detecting unit, and generate a P picture or a B picture;

a storage unit configured to store decoded images, which are obtained by decoding the I picture generated by the intra-picture prediction encoding unit and the P picture generated by the inter-picture prediction encoding unit, respectively, as candidate images of the reference images;
a detecting unit configured to detect a brightness change of the subject for sequential image frames and detect an image frame in which the brightness of the subject is significantly different from other image frames; and
a selecting unit configured to select decoded images to be stored in the storage unit as the candidate images so that decoded images obtained by decoding I pictures or P pictures, which are obtained by encoding image frames detected by the detecting unit as image frames in which the brightness of the subject is significantly different, are not stored in the storage unit,
wherein the motion information detecting unit obtains the at least one reference image from among a plurality of decoded images selected by the selecting unit and stored as the candidate images in the storage unit.

12. A control method of encoding a moving image according to an prediction coding method using a reference image for a digital video camera having an image sensing unit configured to pick up a plurality of image frames of a subject and generate the moving image including the plurality of image frames, the control method comprising:
an intra-picture predicting encoding step of encoding an image frame of the generated moving image based on an intra-picture prediction and generating an I picture;
a motion information detecting step of detecting motion information of the image frame of the generated moving image to be encoded using at least one of reference images;
an inter-picture prediction encoding step of encoding a difference between (i) the image frame of the generated moving image to be encoded and (ii) a predicted image frame generated based on the motion information of the image frame to be encoded, which is detected in the motion information detecting step, and generating a P picture or a B picture;
a storage step of storing decoded images, which are obtained by decoding the I picture generated in the intra-picture-prediction encoding step and the P picture generated in the inter-picture prediction encoding step, respectively, as candidate images of the reference images into a storage unit;
a detection step of detecting a brightness change of the subject for sequential image frames and detecting an image frame in which the brightness of the subject is significantly different from other image frames; and
a selecting step of selecting decoded images to be stored in the storage unit as the candidate images so that decoded images obtained by decoding I pictures or P pictures, which are obtained by encoding image frames detected in the detection step as image frames in which the brightness of the subject is significantly different, are not stored in the storage unit,
wherein the motion information detecting step obtains the at least one reference image from among a plurality of decoded images selected in the selecting step and stored as the candidate images in the storage unit.

* * * * *